(12) United States Patent
Suto et al.

(10) Patent No.: US 11,525,676 B2
(45) Date of Patent: Dec. 13, 2022

(54) DISTANCE MEASURING CAMERA

(71) Applicant: MITSUMI ELECTRIC CO., LTD., Tokyo (JP)

(72) Inventors: Satoru Suto, Tokyo (JP); Takashi Matsumoto, Tokyo (JP); Masato Ehara, Tokyo (JP); Satoshi Ajiki, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 404 days.

(21) Appl. No.: 16/636,275

(22) PCT Filed: Feb. 23, 2018

(86) PCT No.: PCT/JP2018/006817
§ 371 (c)(1),
(2) Date: Feb. 3, 2020

(87) PCT Pub. No.: WO2019/030957
PCT Pub. Date: Feb. 14, 2019

(65) Prior Publication Data
US 2020/0378759 A1 Dec. 3, 2020

(30) Foreign Application Priority Data

Aug. 9, 2017 (JP) .............................. JP2017-154278
Jan. 24, 2018 (JP) .............................. JP2018-010035

(51) Int. Cl.
*G01C 3/32* (2006.01)
*G03B 13/20* (2021.01)
(Continued)

(52) U.S. Cl.
CPC ..................................... *G01C 3/32* (2013.01)

(58) Field of Classification Search
None
See application file for complete search history.

(56) References Cited

U.S. PATENT DOCUMENTS

| 2012/0044576 A1* | 2/2012 | Okumura ....... G02B 15/144511 |
| | | 359/686 |
| 2017/0067781 A1* | 3/2017 | Darty ....................... G01J 3/108 |
| 2018/0184070 A1* | 6/2018 | Nash ........................ G06T 7/593 |

FOREIGN PATENT DOCUMENTS

| JP | H03200007 A | 9/1991 |
| JP | 2001141422 A | 5/2001 |

(Continued)

OTHER PUBLICATIONS

ISA European Patent Office, International Search Report Issued in Application No. PCT/JP2018/006817, dated Jun. 6, 2018, WIPO, 2 pages.

*Primary Examiner* — Christopher Braniff
(74) *Attorney, Agent, or Firm* — McCoy Russell LLP

(57) ABSTRACT

A distance measuring camera 1 includes a first optical system for collecting light from a subject to form a first subject image, a second optical system for collecting the light from the subject to form a second subject image, an imaging part for imaging the first subject image formed by the first optical system and the second subject image formed by the second optical system, and a distance calculating part 4 for calculating a distance to the subject based on the first subject image and the second subject image imaged by the imaging part S. The first optical system and the second optical system are configured so that a change of a magnification of the first subject image according to the distance to the subject is different from a change of a magnification of the second subject image according to the distance to the subject.

13 Claims, 13 Drawing Sheets

(51) Int. Cl.
*H04N 13/25* (2018.01)
*H04N 13/00* (2018.01)
*G03B 35/08* (2021.01)

(56) References Cited

FOREIGN PATENT DOCUMENTS

| | | |
|---|---|---|
| JP | 2013190394 A | 9/2013 |
| RU | 2095756 C1 | 11/1997 |
| RU | 2340872 C1 | 12/2008 |

\* cited by examiner

DISTANCE MEASURING CAMERA

CROSS-REFERENCE TO RELATED APPLICATIONS

The present application is a U.S. National Phase of International Patent Application Serial No. PCT/JP2018/006817 entitled "DISTANCE MEASURING CAMERA," filed on Feb. 23, 2018. International Patent Application Serial No. PCT/JP2018/006817 claims priority to Japanese Patent Application No. 2017-154278 filed on Aug. 9, 2017 and Japanese Patent Application No. 2018-010035 filed on Jan. 24, 2018. The entire contents of each of the above-referenced applications are hereby incorporated by reference for all purposes.

TECHNICAL FIELD

The present invention generally relates to distance measuring cameras for measuring a distance to a subject, in particular to a distance measuring camera for measuring a distance to a subject based on an image magnification ratio between at least two subject images respectively formed by at least two optical systems whose changes of magnitudes of the subject images according to the distance to the subject are different from each other.

BACKGROUND ART

In recent years, there is proposed a distance measuring camera for measuring a distance to a subject by imaging the subject. As such a distance measuring camera, a stereo camera type distance measuring camera including two or more pairs of an optical system for forming an image of light from a subject and an image sensor for converting a subject image formed by the optical system to an image signal and a pattern projection type distance measuring camera including a projector for projecting constant pattern light (such as grid pattern light) onto a subject and an imaging system for imaging the subject onto which the constant pattern light is being projected are known (for example, see patent literature 1).

In the stereo camera type distance measuring camera, the two or more pairs of the optical system and the image sensor are used to obtain a plurality of images having different parallel disparities (horizontal disparities) and the distance to the subject is calculated based on the parallel disparities among the plurality of obtained images. In order to accurately calculate the distance to the subject based on the parallel disparities among the plurality of images, it is necessary to configure a large parallel disparity. Thus, it is required to arrange the two or more optical systems with being far apart from each other in one distance measuring camera. This results in increase in a size of the distance measuring camera.

In the pattern projection type distance measuring camera, the constant pattern light is projected onto the subject and distortions of the constant pattern light projected onto the subject is analyzed to measure the distance to the subject. Thus, the pattern projection type distance measuring camera needs the projector for projecting the constant pattern light onto the subject. This results in increase in a configuration of the distance measuring camera.

RELATED ART

Citation List

Patent Literature

[PTL 1]
JP-A 2013-190394

SUMMARY OF INVENTION

Technical Problem

The present invention has been made in view of the problems of the conventional art mentioned above. Accordingly, it is an object of the present invention to provide a distance measuring camera which can calculate a distance to a subject without using parallel disparities among a plurality of images and without projecting constant pattern light onto the subject.

Solution to Problem

The above object is achieved by the present inventions defined in the following (1) to (11).

(1) A distance measuring camera, comprising:
a first optical system for collecting light from a subject to form a first subject image;
a second optical system for collecting the light from the subject to form a second subject image;
an imaging part for imaging the first subject image formed by the first optical system and the second subject image formed by the second optical system; and
a distance calculating part for calculating a distance to the subject based on the first subject image and the second subject image imaged by the imaging part,
wherein the first optical system and the second optical system are configured so that a change of a magnification of the first subject image according to the distance to the subject is different from a change of a magnification of the second subject image according to the distance to the subject, and
wherein the distance calculating part calculates the distance to the subject based on an image magnification ratio between the magnification of the first subject image and the magnification of the second subject image.

(2) The distance measuring camera according to the above (1), wherein the first optical system and the second optical system are configured so that a focal length of the first optical system and a focal length of the second optical system are different from each other, and thereby the change of the magnification of the first subject image according to the distance to the subject is different from the change of the magnification of the second subject image according to the distance to the subject.

(3) The distance measuring camera according to the above (2), wherein at least one of the first optical system and the second optical system contains a convex lens for collecting the light from the subject and a concave lens for diffusing the light from the subject.

(4) The distance measuring camera according to the above (3), wherein in a case where both of the first optical system and the second optical system contain the convex lens and the concave lens, the first optical system and the second optical system are configured so that the focal length of the first optical system and the focal length of the second optical system are different from each other by adjusting the number, positions and focal lengths of the concave lenses contained in the first optical system and the second optical system.

(5) The distance measuring camera according to any one of the above (1) to (4), further comprising a first lens actuator for performing a focusing operation for the first optical system and a second lens actuator for performing a focusing operation for the second optical system, wherein the first optical system, the second optical system and the imaging part are arranged so as to focus on an infinite distance point in an initial state that the first lens actuator and the second lens actuator do not perform the focusing operations.

(6) The distance measuring camera according to the above (5), wherein a depth disparity in an optical axis direction exists between a front principal point of the first optical system in the initial state and a front principal point of the second optical system in the initial state, and thereby the change of the magnification of the first subject image according to the distance to the subject is different from the change of the magnification of the second subject image according to the distance to the subject.

(7) The distance measuring camera according to any one of the above (1) to (6), further comprising an association information storage part storing association information for associating the image magnification ratio between the magnification of the first subject image and the magnification of the second subject image with the distance to the subject, wherein the distance calculating part calculates the distance to the subject based on the image magnification ratio between the magnification of the first subject image and the magnification of the second subject image and the association information in the association information storage part.

(8) The distance measuring camera according to any one of the above (1) to (7), wherein the distance calculating part calculates a ratio between a size of the first subject image and a size of the second subject image as the image magnification ratio between the magnification of the first subject image and the magnification of the second subject image.

(9) The distance measuring camera according to any one of the above (1) to (8), further comprising a first bandpass filter for passing only light in a specific wavelength band of the light from the subject collected by the first optical system and a second bandpass filter for passing only light in a specific wavelength band of the light from the subject collected by the second optical system, wherein the specific wavelength band of the light which can pass through the first bandpass filter is different from the specific wavelength band of the light which can pass through the second bandpass filter.

(10) The distance measuring camera according to any one of the above (1) to (9), wherein the imaging part contains a first image sensor for imaging the first subject image and a second image sensor for imaging the second subject image.

(11) The distance measuring camera according to any one of the above (1) to (9), wherein the imaging part is a single image sensor for imaging both of the first subject image and the second subject image.

Advantageous Effects of Invention

The distance measuring camera of the present invention uses the two optical systems configured so that the changes of the magnifications of the subject images according to the distance to the subject are different from each other and can measure the distance to the subject based on the image magnification ratio (the ratio of the magnifications) between the two subject images respectively formed by the two optical systems. Thus, in the distance measuring camera of the present invention, it is not necessary to ensure a large parallel disparity unlike the conventional stereo camera type distance measuring camera using parallel disparities among a plurality of images. Thus, even if the two optical systems are arranged so as to be close to each other, it is possible to accurately calculate the distance to the subject. As a result, it is possible to reduce a size of the distance measuring camera compared with the conventional stereo camera type distance measuring camera. Further, according to the present invention, it becomes unnecessary to design the distance measuring camera with considering the parallel disparities. Thus, it is possible to enhance the flexibility of design for the distance measuring camera.

Further, in the distance measuring camera of the present invention, it is not necessary to use a special light source such as a projector for projecting constant pattern light onto the subject unlike the conventional pattern projection type distance measuring camera. Thus, it is possible to simplify a system configuration of the distance measuring camera. As a result, it is possible to realize downsizing, power-serving and cost-reducing of the distance measuring camera compared with the conventional pattern projection type distance measuring camera.

DESCRIPTION OF EMBODIMENTS

First, description will be given to a principle for calculating a distance to a subject which is used in a distance measuring camera of the present invention.

As is well known, a magnification "m" of a subject image formed by an optical system can be calculated from a distance (a subject distance) "a" from a front principal point (a front principal plane) of the optical system to the subject, a distance "b" from a rear principal point (a rear principal plane) of the optical system to an image formation point of the subject image and a focal length "f" of the optical system according to the following equations (1) and (2).

Equation 1

$$\frac{1}{a} + \frac{1}{b} = \frac{1}{f} \text{ (lens equation)} \rightarrow b = \frac{af}{a-f} \quad (1)$$

Equation 2

$$m = \frac{b}{a} = \frac{f}{a-f} \quad (2)$$

When an imaging surface of an image sensor is located at the image formation position of the subject image (that is in the case of best focusing), the magnification "m" of the subject image formed on the imaging surface of the image sensor by the optical system is a function of the distance "a" from the front principal point of the optical system to the subject and the focal length "f" of the optical system as is clear from the above equation (2). When the focal length "f" of the optical system is fixed, the magnification "m" of the subject image changes according to the distance "a" to the subject.

Figure 1:
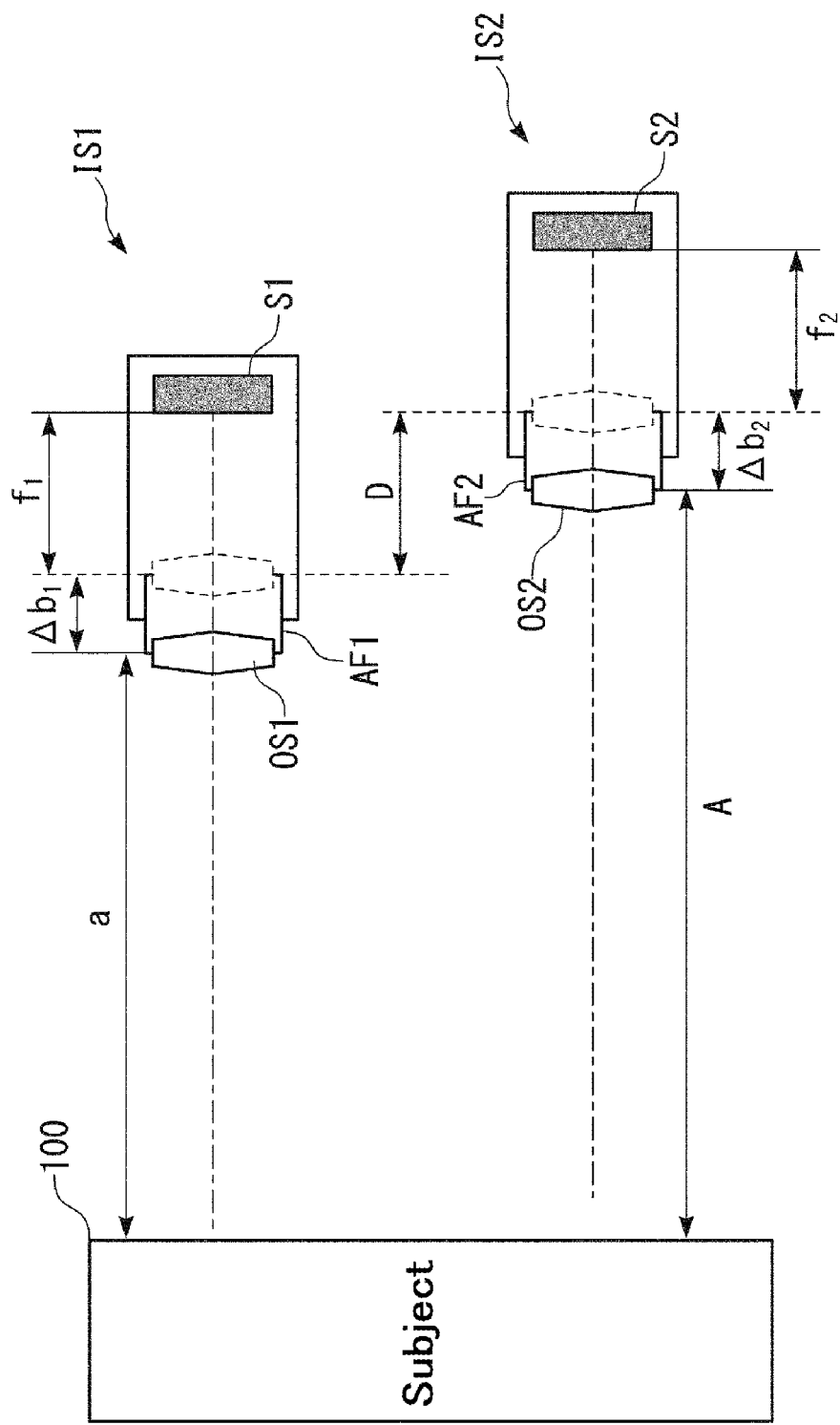
FIG. 1 is a view for explaining a distance measuring principle of a distance measuring camera of the present invention.

Here, it is assumed that the one subject 100 is imaged by two imaging systems IS1, IS2 as shown in FIG. 1. The first imaging system IS1 includes a first optical system OS1 for collecting light from the subject 100 to form a first subject image, a first lens actuator AF1 for performing a focusing operation (or an automatic focusing operation) for the first optical system OS1 by actuating at least one lens (such as a focusing lens) constituting the first optical system OS1 and a first image sensor S1 for imaging the first subject image formed by the first optical system OS1. The second imaging system IS2 includes a second optical system OS2 for collecting the light from the subject 100 to form a second subject image, a second lens actuator AF2 for performing a focusing operation (or an automatic focusing operation) for the second optical system OS2 by actuating at least one lens (such as a focusing lens) constituting the second optical system OS2 and a second image sensor S2 for imaging the second subject image formed by the second optical system OS2. Further, as is clear from FIG. 1, although an optical axis of the first optical system OS1 of the first imaging system IS1 and an optical axis of the second optical system OS2 of the second imaging system IS2 are parallel to each other, the optical axis of the first optical system OS1 and the optical axis of the second optical system OS2 do not coincide with each other. In this regard, for the purpose of illustration, the first optical system OS1 is schematically illustrated so that a front principal point and a rear principal point of the first optical system OS1 are located at a center position of the first optical system OS1 and the second optical system OS2 is schematically illustrated so that a front principal point and a rear principal point of the second optical system OS2 are located at a center position of the second optical system OS2 as is the case for the first optical system OS1.

The first optical system OS1 and the second optical system OS2 are configured to respectively have focal lengths "$f_1$", "$f_2$" differing from each other. Further, the first optical system OS1 and the first image sensor S1 are arranged so as to focus on an infinite distance point in an initial state that the first lens actuator AF1 does not perform the focusing operation by actuating (moving) at least one lens constituting the first optical system OS1. Namely, in FIG. 1, in the initial state in which the first optical system OS1 is illustrated with a dotted line, a distance from the rear principal point of the first optical system OS1 to an imaging surface of the first image sensor S1 is equal to the focal length "$f_1$" of the first optical system OS1.

Similarly, the second optical system OS2 and the second image sensor S2 are arranged so as to focus on the infinite distance point in an initial state that the second lens actuator AF2 does not perform the focusing operation by actuating (moving) at least one lens constituting the second optical system OS2. Namely, in FIG. 1, in the initial state in which the second optical system OS2 is illustrated with a dotted line, a distance from the rear principal point of the second optical system OS2 to an imaging surface of the second image sensor S2 is equal to the focal length "$f_2$" of the second optical system OS2.

Further, the first optical system OS1 and the second optical system OS2 are arranged so that a depth disparity "D" in an optical axis direction exists between the front principal point of the first optical system OS1 of the first imaging system IS1 in the initial state and the front principal point of the second optical system OS2 of the second imaging system IS2 in the initial state.

In a case where the subject 100 is located at an arbitrary distance when the subject 100 is imaged by the first imaging system IS1, the subject 100 is out of focus in the initial state (the subject 100 is defocused in the initial state) and thus the first lens actuator AF1 performs the focusing operation for the first optical system OS1. At this time, the at least one lens (such as a focusing lens) constituting the first optical system OS1 is moved to the front side by the first lens actuator AF1. As a result, positions of the front principal point and the rear principal point of the first optical system OS1 are shifted. Here, a shift amount of the front principal point and the rear principal point of the first optical system OS1 due to the focusing operation is defined as "$\Delta b_1$". Further, a distance from the front principal point of the first optical system OS1 to the subject 100 after the focusing operation has been performed is defined as "a".

As is the case for the first optical system OS1, in a case where the subject 100 is located at an arbitrary distance when the subject 100 is imaged by the second imaging system IS2, the subject 100 is out of focus in the initial state (the subject 100 is defocused in the initial state) and thus the second lens actuator AF2 performs the focusing operation for the second optical system OS2. At this time, the at least one lens (such as a focusing lens) constituting the second optical system OS2 is moved to the front side by the second lens actuator AF2. As a result, positions of the front principal point and the rear principal point of the second optical system OS2 are shifted. Here, a shift amount of the front principal point and the rear principal point of the second optical system OS2 due to the focusing operation is defined as "$\Delta b_2$". Further, a distance from the front principal point of the second optical system OS2 to the subject 100 after the focusing operation has been performed is defined as "A".

Here, as is clear from FIG. 1, the distance "A" from the front principal point of the second optical system OS2 to the subject 100 can be expressed by the following equation (3) with the distance "a" from the front principal point of the first optical system OS1 to the subject 100.

Equation 3

$$A = a + \Delta b_1 + D - \Delta b_2 \quad (3)$$

Here, in a state that the first imaging system IS1 is focused on the subject 100 located apart from the front principal point of the first optical system OS1 by the distance "a", a distance "$b_1$" from the rear principal point of the first optical system OS1 to the imaging surface of the first image sensor S1 is equal to "$1/f_1 - 1/a$" due to the lens equation. Thus, the shift amount "$\Delta b_1$" of the front principal point and the rear principal point of the first optical system OS1 can be expressed by the following equation (4) with a difference between the distance "$b_1$" and a distance from the rear principal point of the first optical system OS1 to the imaging surface of the first image sensor S1 in the state of focusing on the infinite distance point (that is a difference between the distance "$b_1$" and the focal length "$f_1$" of the first optical system OS1).

Equation 4

$$\Delta b_1 = b_1 - f_1 = \left(\frac{1}{f_1} - \frac{1}{a}\right)^{-1} - f_1 = \frac{f_1^2}{a - f_1} \quad (4)$$

As is the case for the first optical system OS1, in a state that the second imaging system IS2 is focused on the subject 100 located apart from the front principal point of the second optical system OS2 by the distance "A", a distance "$b_2$" from the rear principal point of the second optical system OS2 to the imaging surface of the second image sensor S2 is equal to "$1/f_2 - 1/A$" due to the lens equation. Thus, the shift amount "$\Delta b_2$" of the front principal point and the rear principal point of the second optical system OS2 can be expressed by the following equation (5) with a difference between the distance "$b_2$" and a distance from the rear principal point of the second optical system OS2 to the imaging surface of the second image sensor S2 in the state of focusing on the infinite distance point (that is a difference between the distance "$b_2$" and the focal length "$f_2$" of the second optical system OS2).

Equation 5

$$\Delta b_2 = b_2 - f_2 = \left(\frac{1}{f_2} - \frac{1}{A}\right)^{-1} - f_2 = \frac{f_2^2}{A - f_2} \quad (5)$$

Further, a magnification "$m_1$" of the first subject image formed on the imaging surface of the first image sensor S1 by the first optical system OS1 and a magnification "$m_2$" of the second subject image formed on the imaging surface of the second image sensor S2 by the second optical system OS2 can be respectively expressed by the following equations (6) and (7) by using the above equation (2).

Equation 6

$$m_1 = \frac{b_1}{a} = \frac{f_1}{a - f_1} \quad (6)$$

Equation 7

$$m_2 = \frac{b_2}{A} = \frac{f_2}{A - f_2} \quad (7)$$

Thus, an image magnification ratio "MR" between the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 can be expressed by the following equation (8) from the above equations (6) and (7).

Equation 8

$$MR = \frac{m_2}{m_1} = \frac{f_2(a - f_1)}{f_1(A - f_2)} \quad (8)$$

Further, by summarizing "$\Delta b_2$" from the above equations (3) and (5), it is possible to obtain a quadratic equation for "$\Delta b_2$" expressed by the following equation (9).

Equation 9

$$\Delta b_2^2 - (X - f_2) \cdot \Delta b_2 + f_2^2 = 0 \quad (9)$$

For the purpose of simplifying the equation, the term of "$X = a d + \Delta b_1$" is used in the above equation (9). X can be expressed by the following equation (10) by using the above equation (4). Further, P in the following equation (10) is "$f_1 - D$".

Equation 10

$$X = a + D + \Delta b_1 = \frac{a^2 - P \cdot a + f_1 \cdot P}{a - f_1} \quad (10)$$

where $P = f_1 - D$

By solving the quadratic equation for "$\Delta b_2$" expressed by the above equation (9), it is possible to obtain the following equation (11).

Equation 11

$$\Delta b_2 = \frac{X - f_2 \pm \sqrt{X^2 - 2f_2 \cdot X - 3f_2^2}}{2} \quad (11)$$

By modifying the above equation (3) related to A by using the above equation (10) related to X and the above equation (11) related to "$\Delta b_2$", it is possible to obtain the following equation (12).

Equation 12

$$A = a + \Delta b_1 + D - \Delta b_2 = X - \Delta b_2 = \frac{X + f_2 \mp \sqrt{X^2 - 2f_2 \cdot X - 3f_2^2}}{2} \quad (12)$$

By substituting the above equation (12) related to A in the above equation (8) related to the image magnification ratio "MR" to simplify the image magnification ratio "MR", it is possible to obtain the following equation (13). Further, K in the following equation (13) is "$f_2/f_1$".

Equation 13

$$MR = \frac{m_2}{m_1} = \frac{f_2(a - f_1)}{f_1(A - f_2)} = \frac{2K \cdot (a - f_1)}{X - f_2 \mp \sqrt{X^2 - 2f_2 \cdot X - 3f_2^2}} \quad (13)$$

where $K = \frac{f_2}{f_1}$

By substituting the above equation (10) related to X and using the term of "$K=f_2/f_1$" in the above equation (13) related to the image magnification ratio "MR" to summarize the distance "a", it is possible to obtain a quadratic equation expressed by the following equation (14). Further, L in the following equation (14) is "$2f_2/(MR \times f_1)$".

Equation 14

$$(L^2 - 2L) \cdot a^2 + 2L \cdot (P + f_2 - L \cdot f_1) \cdot a + \quad (14)$$
$$(4f_2^2 + L^2 \cdot f_1^2 - 2L \cdot P \cdot f_1 - 2L \cdot f_1 \cdot f_2) = 0$$

where $L = \frac{2f_2}{MR \cdot f_1}$

By solving the above quadratic equation expressed by the above equation (14) and using the above relationships of "$P=f_1-D$" and "$L=2f_2/(MR \times f_1)$", it is possible to obtain two solutions for the distance "a" respectively expressed by the following general equations (15) and (16).

Equation 15

$$a = \frac{MR \cdot f_1 \cdot (D - f_1 - f_2) + 2f_1 \cdot f_2 + MR \cdot f_1 \cdot \sqrt{-3(f_1 + f_2)^2 + 2D \cdot (f_1 - f_2) + 4f_1 \cdot f_2 \cdot \left(\frac{1}{MR} + MR + 1\right) + D^2}}{2(f_2 - MR \cdot f_1)} \quad (15)$$

Equation 16

$$a = \frac{MR \cdot f_1 \cdot (D - f_1 - f_2) + 2f_1 \cdot f_2 - MR \cdot f_1 \cdot \sqrt{-3(f_1 + f_2)^2 + 2D \cdot (f_1 - f_2) + 4f_1 \cdot f_2 \cdot \left(\frac{1}{MR} + MR + 1\right) + D^2}}{2(f_2 - MR \cdot f_1)} \quad (16)$$

It is changed depending on a relationship between the focal length "$f_1$" of the first optical system OS1 and the focal length "$f_2$" of the second optical system OS2 that which of the two solutions for the distance "a" respectively expressed by the above general equations (15) and (16) is proper as the distance "a". Namely, it is determined based on the following condition branches (1) to (3) that which of the two solutions respectively expressed by the above general equations (15) and (16) is proper as the distance "a".

(1) Case of "$f_2 <= f_1$"

In a case where the focal length "$f_1$" of the first optical system OS1 and the focal length "$f_2$" of the second optical system OS2 satisfy a relationship of "$f_2 \le f_1$", the solution expressed by the above general equation (15) is proper as the distance "a".

(2) Case of "$f_2 >= f_1 + D$"

In a case where the focal length "$f_1$" of the first optical system OS1 and the focal length "$f_2$" of the second optical system OS2 satisfy a relationship of "$f_2 \ge f_1 + D$", the solution expressed by the above general equation (16) is proper as the distance "a".

(3) Case of "$f_1 < f_2 < f_1 + D$"

In a case where the focal length "$f_1$" of the first optical system OS1 and the focal length "$f_2$" of the second optical system OS2 satisfy a relationship of "$f_1 < f_2 < f_1 + D$", additional condition branches are required. Namely, in the case where the relationship of "$f_1 < f_2 < f_1 + D$" is satisfied, it is changed depending on the following condition branches (3-1) to (3-3) that which of the two solutions respectively expressed by the above general equations (15) and (16) is proper as the distance "a".

(3-1) Case of "$L^2 - 2L <= 0$"

In a case where the coefficient "$L^2 - 2L$" of the term $a^2$ in the above equation (14) is equal to or less than zero (in a case of "$L^2 - 2L <= 0$"), the solution expressed by the above general equation (16) is proper as the distance "a".

On the other hand, in a case where the coefficient "$L^2 - 2L$" of the term $a^2$ in the above equation (14) is more than zero (in a case of "$L^2 - 2L > 0$"), it is changed depending on a differential value g'(a) of a position g(a) of an axis of symmetry for a quadratic curve expressed by the above equation (14) that which of the two solutions respectively expressed by the above general equations (15) and (16) is proper as the distance "a". In this regard, the position g(a) of the axis of the quadratic curve which is a function of the distance "a" and expressed by the above equation (14) can be expressed by the following equation (17).

Equation 17

$$g(a) = \frac{-(2L(P + f_2 - L \cdot f_1))}{2(L^2 - 2L)} = \frac{MR \cdot f_1 \cdot (D - f_1 - f_2) + 2f_1 \cdot f_2}{2(f_2 - MR \cdot f_1)} \quad (17)$$

(3-2) Case of "$L^2 - 2L > 0$" and "$g'(a) <= 0$"

In a case where the coefficient "$L^2 - 2L$" of the term $a^2$ in the above equation (14) is more than zero and the differential value g'(a) of the position g(a) of the axis of symmetry for the quadratic curve expressed by the above equation (14) is equal to or less than zero (in a case of "$L^2 - 2L > 0$" and "$g'(a) <= 0$"), the solution expressed by the above general equation (16) is proper as the distance "a".

(3-3) Case of "$L^2 - 2L > 0$" and "$g'(a) > 0$"

In a case where the coefficient "$L^2 - 2L$" of the term $a^2$ in the above equation (14) is more than zero and the differential value g'(a) of the position g(a) of the axis of symmetry for the quadratic curve expressed by the above equation (14) is more than zero (in a case of "$L^2 - 2L > 0$" and "$g'(a) > 0$"), the solution expressed by the above general equation (15) is proper as the distance "a".

In the above general equations (15) and (16), the focal length "$f_1$" of the first optical system OS1, the focal length "$f_2$" of the second optical system OS2 and the depth disparity "D" between the front principal point of the first optical system OS1 in the initial state and the front principal point of the second optical system OS2 in the initial state are fixed values determined at the time of configuring and arranging the first optical system OS1 and the second optical system OS2. Thus, if the image magnification ratio "MR" is obtained, it is possible to uniquely calculate the distance "a" from the front principal point of the first optical system OS1 to the subject 100 by using the above general equation (15) or (16) according to the above-described condition branches.

Figure 2:
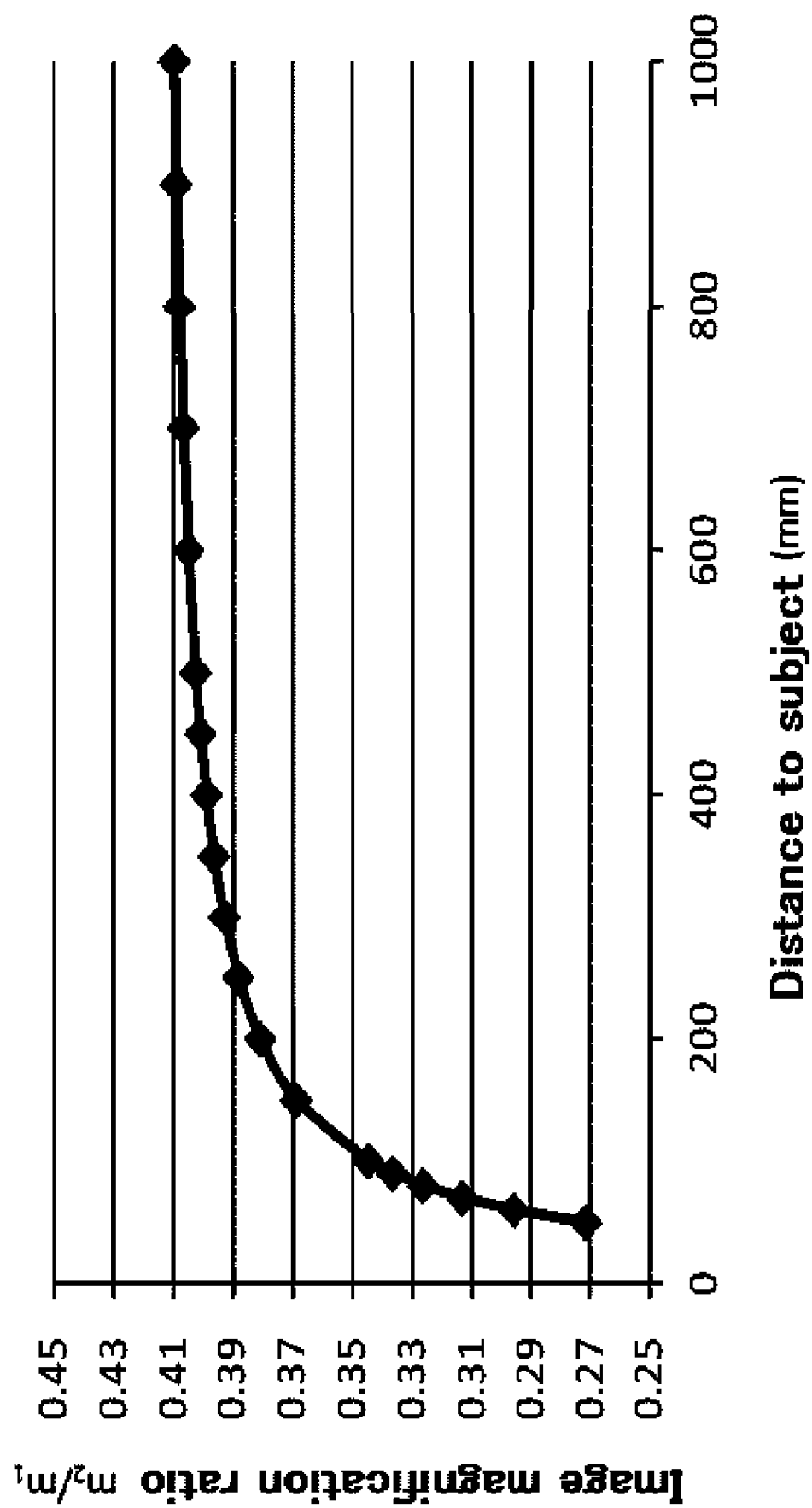
FIG. 2 is a graph for explaining that an image magnification ratio between a magnification of a first subject image formed by a first optical system shown in FIG. 1 and a magnification of a second subject image formed by a second optical system shown in FIG. 1 changes according to a distance to a subject.

FIG. 2 shows one example of a relationship between the distance "a" to the subject 100 and the image magnification ratio "MR" of the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2. This example of the relationship can be calculated based on the above general equation (15) or (16). As is clear from FIG. 2, it is possible to identify the distance "a" to the subject 100 from a value of the image magnification ratio "MR".

On the other hand, the image magnification ratio "MR" can be calculated from the following equation (18). In the following equation (18), "sz" is an actual size (height or width) of the subject 100, "$Y_1$" is a size (image height or image width) of the first subject image formed on the imaging surface of the first image sensor S1 by the first optical system OS1 and "$Y_2$" is a size (image height or image width) of the second subject image formed on the imaging surface of the second image sensor S2 by the second optical system OS2.

Equation 18

$$MR = \frac{m_2}{m_1} = \frac{Y_2/sz}{Y_1/sz} = \frac{Y_2}{Y_1} \quad (18)$$

The size "$Y_1$" of the first subject image and the size "$Y_2$" of the second subject image can be respectively calculated from an image signal of the first subject image and an image signal of the second subject image obtained by respectively imaging the first subject image and the second subject image with the first image sensor S1 and the second image sensor S2. Thus, it is possible to actually measure the size "$Y_1$" of the first subject image and the size "$Y_2$" of the second subject image from the image signal of the first subject image and the image signal of the second subject image actually obtained by respectively imaging the first subject image and the second subject image with the first image sensor S1 and the second image sensor S2. Further, it is possible to obtain the image magnification ratio "MR" between the magnification "$m_1$" of the first subject image and the magnification "$m_2$" of the second subject image based on the actually measured size "$Y_1$" of the first subject image and the actually measured size "$Y_2$" of the second subject image.

According to the above-described principle, the distance measuring camera of the present invention calculates the image magnification ratio "MR" between the magnification "$m_1$" of the first subject image and the magnification "$m_2$" of the second subject image based on the actually measured size "$Y_1$" of the first subject image and the actually measured size "$Y_2$" of the second subject image and calculates the distance "a" from the front principal point of the first optical system OS1 to the subject 100 by using the calculated image magnification ratio "MR".

Figure 3:
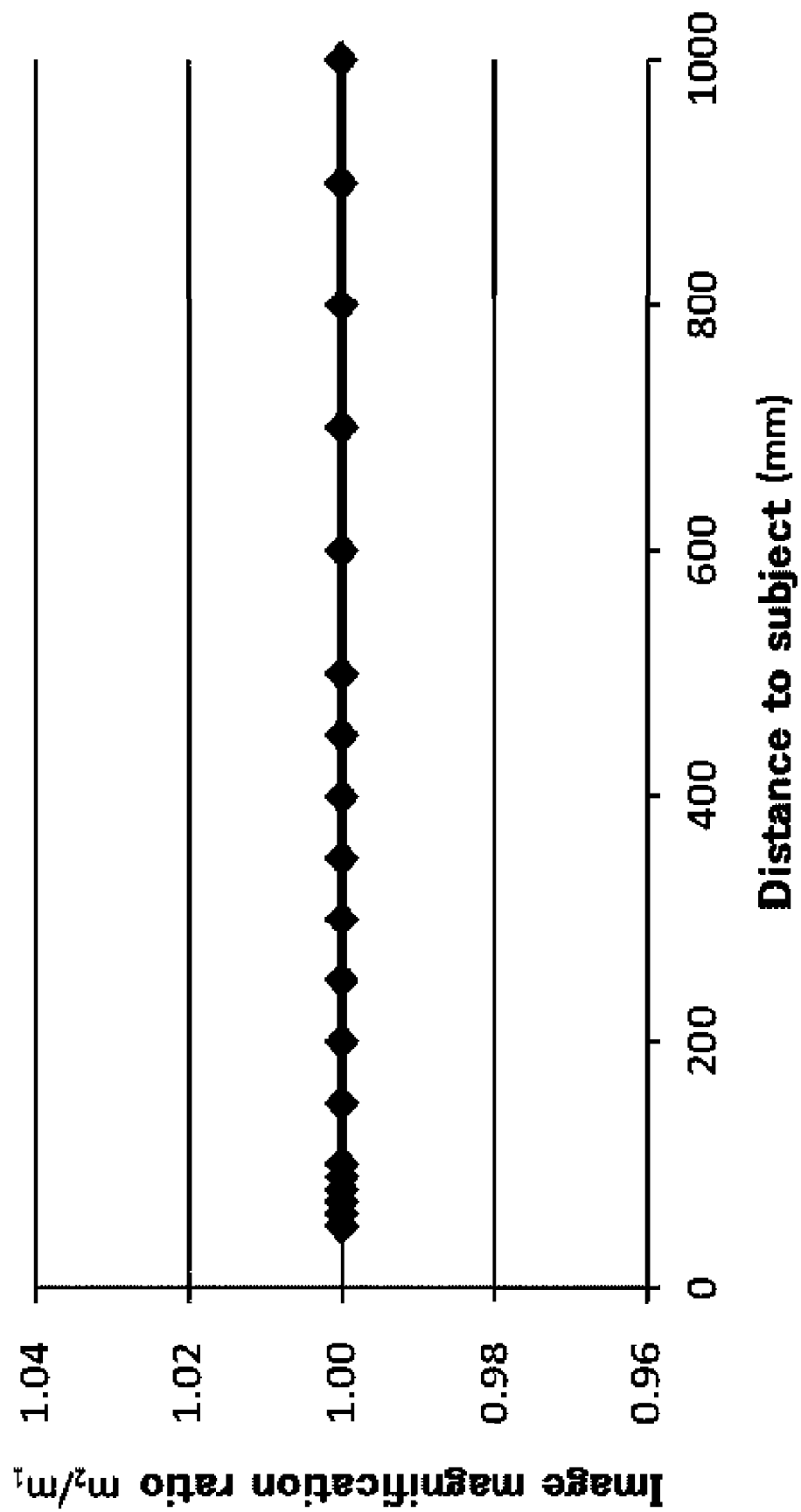
FIG. 3 is a graph for explaining a case where the image magnification ratio between the magnification of the first subject image and the magnification of the second subject image does not change according to the distance to the subject.

In this regard, as is clear from the above equation (13) related to the image magnification ratio "MR", in a case where the focal length "$f_1$" of the first optical system OS1 is equal to the focal length "$f_2$" of the second optical system OS2 ($f_1=f_2=f$) and the depth disparity "D" does not exist between the front principal point of the first optical system OS1 in the initial state and the front principal point of the second optical system OS2 in the initial state (D=0, that is a=A), the image magnification ratio "MR" is not the function of the distance "a" and becomes a constant value. In this case, the change of the magnification "$m_1$" of the first subject image according to the distance "a" to the subject 100 becomes the same as the change of the magnification "$m_2$" of the second subject image according to the distance "a" to the subject 100 as shown in FIG. 3 and thus it becomes impossible to calculate the distance "a" to the subject 100 based on the image magnification ratio "MR".

Thus, in the distance measuring camera of the present invention, the first optical system OS1 and the second optical system OS2 are configured and arranged so as to satisfy at least one of the following two conditions, and thereby the change of the magnification "$m_1$" of the first subject image according to the distance "a" to the subject 100 becomes different from the change of the magnification "$m_2$" of the second subject image according to the distance "a" to the subject 100.

(First condition) The focal length "$f_1$" of the first optical system OS1 and the focal length "$f_2$" of the second optical system OS2 are different from each other ($f_1 \neq f_2$).

(Second condition) The depth disparity "D" exists between the front principal point of the first optical system OS1 in the initial state that the first lens actuator AF1 does not perform the focusing operation and the front principal point of the second optical system OS2 in the initial state that the second lens actuator AF2 does not perform the focusing operation (D≠0).

In addition, even if at least one of the first condition and the second condition described above is satisfied, it is required for calculating the distance "a" to the subject 100 with the above general equation (15) or (16) that the first optical system OS1 and the second optical system OS2 are configured and arranged so as to satisfy the following conditions expressed by the following equations (19) and (20). Hereinafter, the condition expressed by the following equation (19) is referred to as a third condition and the condition expressed by the following equation (20) is referred to as a fourth condition.

Equation 19

$$MR \neq \frac{f_2}{f_1} \quad (19)$$

Equation 20

$$-3(f_1 + f_2)^2 + 2D(f_1 - f_2) + 4f_1 \cdot f_2 \cdot \left(\frac{1}{MR} + MR + 1\right) + D^2 \geq 0 \quad (20)$$

In a case where the condition expressed by the above equation (19) (the third condition) is not satisfied (that is a case of "$MR=f_2/f_1$"), the denominator of the above general equation (15) or (16) becomes zero and thus it becomes impossible to calculate the distance "a" to the subject 100 based on the image magnification ratio "MR". On the other hand, in a case where the condition expressed by the above equation (20) (the fourth condition) is not satisfied (that is a case where the left member of the equation (20) becomes a negative value), the distance "a" to the subject 100 contains an imaginary number. Thus, the obtained distance "a" in this case becomes improper.

Thus, in order to calculate the distance "a" to the subject 100 based on the image magnification ratio "MR", the distance measuring camera of the present invention is configured so as to satisfy at least one of the first condition and the second condition described above, the third condition and the fourth condition. Thus, by calculating the image magnification ratio "MR" from the size "$Y_1$" of the first subject image and the size "$Y_2$" of the second subject image actually measured from the image signal of the first subject image and the image signal of the second subject image obtained by using the distance measuring camera of the present invention, it becomes possible to calculate the distance "a" from the front principal point of the first optical system OS1 to the subject 100.

Hereinafter, description will be given to the distance measuring camera which can calculate the distance to the subject by utilizing the above-described principle based on the preferred embodiments illustrated in the accompanying drawings.

First Embodiment

Figure 4:
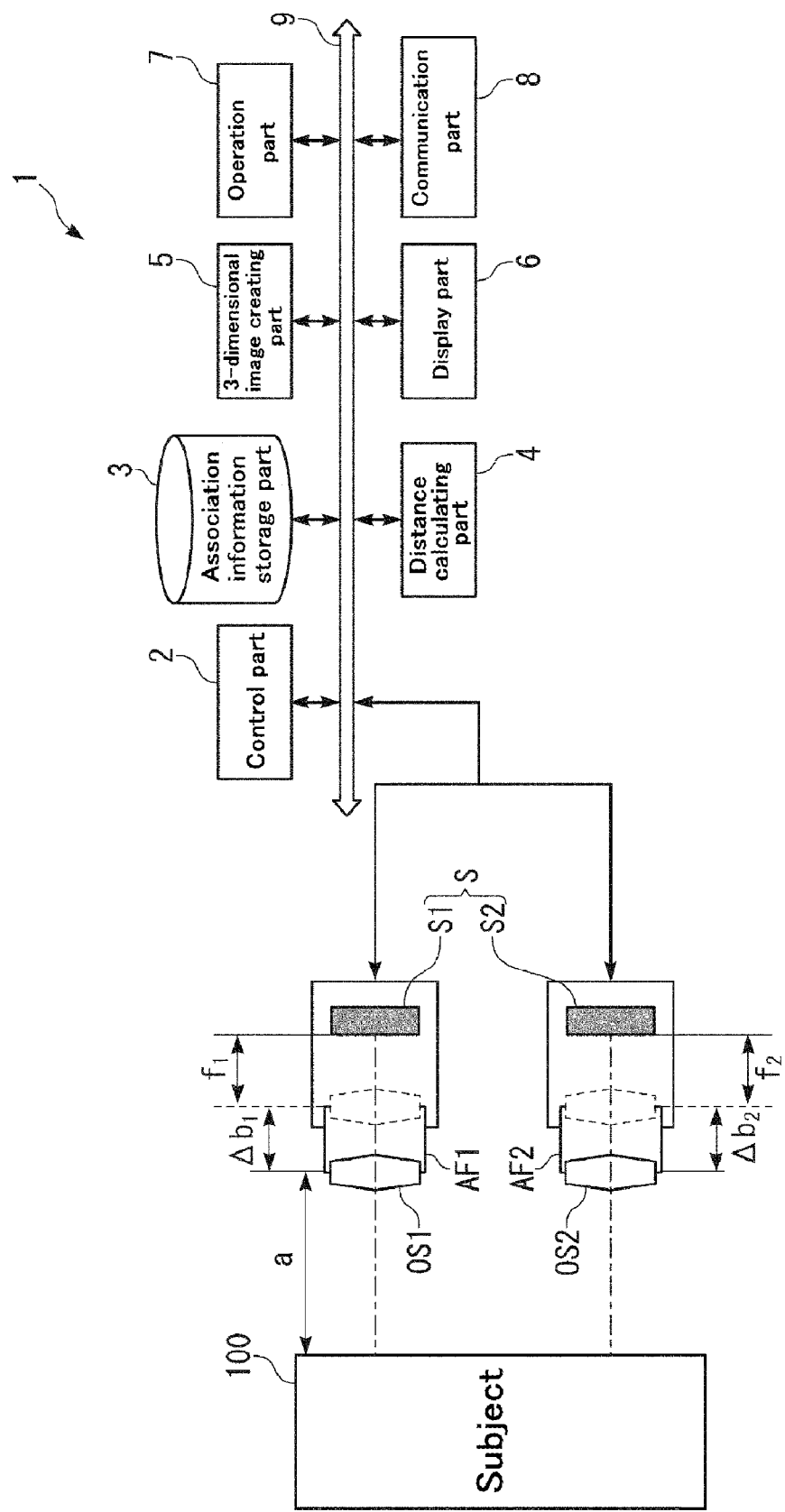
FIG. 4 is a block diagram schematically showing a distance measuring camera according to a first embodiment of the present invention.
Figure 5:
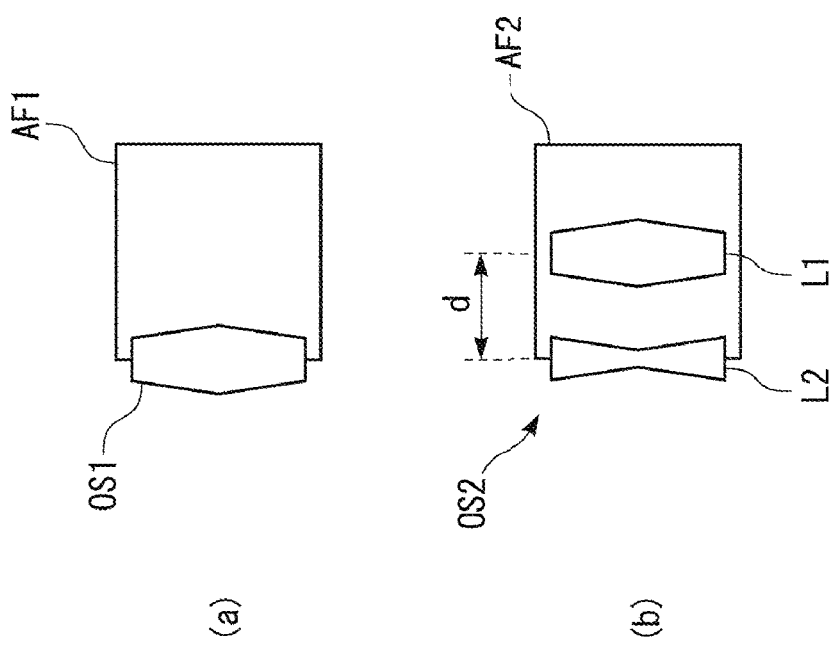
FIG. 5 is a view schematically showing configuration examples of a first optical system and a second optical system shown in FIG. 4.

First, a distance measuring camera according to a first embodiment of the present invention will be described in detail with reference to FIGS. 4 to 5. FIG. 4 is a block diagram schematically showing the distance measuring camera according to the first embodiment of the present invention. FIG. 5 is a view schematically showing configuration examples of a first optical system and a second optical system shown in FIG. 4.

A distance measuring camera 1 shown in FIG. 4 includes a control part 2 for performing control of the distance measuring camera 1, a first optical system OS1 for collecting light from a subject 100 to form a first subject image, a first lens actuator AF1 for performing a focusing operation (or an automatic focusing operation) for the first optical system OS1, a second optical system OS2 for collecting the light from the subject 100 to form a second subject image, a second lens actuator AF2 for performing a focusing operation (or an automatic focusing operation) for the second optical system OS2, an imaging part S for imaging the first subject image formed by the first optical system OS1 and the second subject image formed by the second optical system OS2, an association information storage part 3 storing association information for associating an image magnification ratio "MR" between a magnification "$m_1$" of the first subject image and a magnification "$m_2$" of the second subject image with a distance "a" to the subject 100, a distance calculating part 4 for calculating the distance "a" to the subject 100 based on the association information in the association information storage part 3 and the first subject image and the second subject image imaged by the imaging part S, a three-dimensional image creating part 5 for creating a three-dimensional image of the subject 100 based on the first subject image or the second subject image imaged by the imaging part S and the distance "a" to the subject 100 calculated by the distance calculating part 4, a display part 6 such as a liquid crystal panel for displaying arbitrary information, an operation part 7 for inputting an operation from a user, a communication part 8 for performing communication with external devices and a data bus 9 for transmitting and receiving data between respective components of the distance measuring camera 1.

In this regard, the configurations of the first optical system OS1 and the second optical system OS2 in this embodiment are merely one example and the present invention is not limited thereto. Each of the first optical system OS1 and the second optical system OS2 may take any aspect as long as at least one of the first condition and the second condition described above, the third condition and the second condition are satisfied, and thereby a change of the magnification "$m_1$" of the first subject image with respect to the distance "a" to the subject 100 is different from a change of the magnification "$m_2$" of the second subject image with respect to the distance "a" to the subject 100. However, the distance measuring camera 1 of this embodiment is characterized in that the first optical system OS1 and the second optical system OS2 are configured so as to satisfy the first condition of the above-described two conditions required for calculating the distance "a" to the subject 100 based on the image magnification ratio "MR". Namely, the distance measuring camera 1 of this embodiment is characterized in that the first optical system OS1 and the second optical system OS2 are configured so as to satisfy the first condition that the focal length "$f_1$" of the first optical system OS1 and the focal length "$f_2$" of the second optical system OS2 are different from each other ($f_1 \neq f_2$). On the other hand, in this embodiment, the first optical system OS1 and the second optical system OS2 are configured and arranged so as not to satisfy the above-described second condition (D≠0). Further, in the distance measuring camera 1 of this embodiment, the first optical system OS1 and the second optical system OS2 are configured so as to satisfy the third condition and the fourth condition described above.

Thus, the above general equations (15) and (16) for calculating the distance "a" to the subject 100 based on the image magnification ratio "MR" are simplified by the condition of "D=0" and can be respectively expressed by the following equations (21) and (22).

Equation 21

$$a = \frac{-MR \cdot f_1 \cdot (f_1 + f_2) + 2f_1 \cdot f_2 + MR \cdot f_1 \cdot \sqrt{-3(f_1 + f_2)^2 + 4f_1 \cdot f_2 \cdot \left(\frac{1}{MR} + MR + 1\right)}}{2(f_2 - MR \cdot f_1)} \quad (21)$$

Equation 22

$$a = \frac{-MR \cdot f_1 \cdot (f_1 + f_2) + 2f_1 \cdot f_2 - MR \cdot f_1 \cdot \sqrt{-3(f_1 + f_2)^2 + 4f_1 \cdot f_2 \cdot \left(\frac{1}{MR} + MR + 1\right)}}{2(f_2 - MR \cdot f_1)} \quad (22)$$

Since the condition of "D=0" is satisfied in this embodiment, it is unnecessary to consider the above-described condition branch (3). In a case where the relationship of the focal length "$f_1$" of the first optical system OS1 and the focal length "$f_2$" of the second optical system OS2 meets the above-described condition branch (1) of "$f_2 < f_1$", the solution expressed by the above equation (21) is proper as the distance "a" and this solution is used as the distance "a" to the subject 100. On the other hand, in a case where the relationship of the focal length "$f_1$" of the first optical system OS1 and the focal length "$f_2$" of the second optical system OS2 meets the above-described condition branch (2) of "$f_2>f_1$", the solution expressed by the above equation (22) is proper as the distance "a" and this solution is used as the distance "a" to the subject 100.

The distance measuring camera 1 of this embodiment images the subject 100 with the imaging part S to calculate the image magnification ratio "MR" between the magnification "$m_1$" of the first subject image and the magnification "$m_2$" of the second subject image and calculates the distance "a" to the subject 100 by using the above equation (21) or (22).

Hereinafter, each component of the distance measuring camera 1 will be described in detail. The control part 2 transmits and receives various data and/or various instructions among each component through the data bus 9 to perform control of the distance measuring camera 1. The control part 2 includes a processor for performing operational processes and a memory storing data, programs, modules and the like required for performing the control of the distance measuring camera 1. The processor of the control part 2 uses the data, the programs, the modules and the like stored in the memory to perform the control of the distance measuring camera 1. Further, the processor of the control part 2 can provide desired functions by using each component of the distance measuring camera 1. For example, the processor of the control part 2 can use the distance calculating part 4 to perform a process for calculating the distance "a" to the subject 100 based on the first subject image and the second subject image imaged by the imaging part S.

For example, the processor of the control part 2 is one or more operation devices such as microprocessors, microcomputers, microcontrollers, digital signal processors (DSPs), central processing units (CPUs), memory control units (MCUs), graphic processing units (GPUs), state machines, logic circuitries, application specific integrated circuits (ASICs) and combinations thereof that can perform operational processes for manipulating signals or the like based on computer-readable instructions. Among other capabilities, the processor of the control part 2 is configured to fetch computer-readable instructions (such as data, programs and modules) stored in the memory of the control part 2 and execute control and signal manipulation.

The memory of the control part 2 is one or more removable or non-removable computer-readable media including volatile memories (such as random-access memories (RAMs), static random-access memories (SRAMs) and dynamic random-access memories (DRAMs)), non-volatile memories (such as read only memories (ROMs), erasable programmable ROMs (EPROMs), flash memories, hard disks, optical disks, digital versatile disks (DVDs), magnetic cassettes, magnetic tapes and magnetic disks) and combinations thereof.

The first optical system OS1 has a function of collecting the light from the subject 100 to form the first subject image on an imaging surface of a first image sensor S1 of the imaging part S. The second optical system OS2 has a function of collecting the light from the subject 100 to form the second subject image on an imaging surface of a second image sensor S2 of the imaging part S. Each of the first optical system OS1 and the second optical system OS2 is constituted of one or more lenses and one or more optical elements such as an aperture. Further, as shown in FIG. 4, although an optical axis of the first optical system OS1 and an optical axis of the second optical system OS2 are parallel to each other, the optical axis of the first optical system OS1 and the optical axis of the second optical system OS2 do not coincide with each other.

As described above, the first optical system OS1 and the second optical system OS2 are configured so that the focal length "$f_1$" of the first optical system OS1 and the focal length "$f_2$" of the second optical system OS2 are different from each other ($f_1 \neq f_2$). With this configuration, the first optical system OS1 and the second optical system OS2 are configured so that the change of the magnification "$m_1$" of the first subject image formed by the first optical system OS1 according to the distance "a" to the subject 100 is different from the change of the magnification "$m_2$" of the second subject image formed by the second optical system OS2 according to the distance "a" to the subject 100.

For example, as shown in FIG. 5, the first optical system OS1 is constituted of a convex lens (a real-image optical component) and the second optical system OS2 is constituted of a convex lens (a real-image optical component) L1 having the same focal length as the convex lens constituting the first optical system OS1 and a concave lens (a virtual-image optical component) L2 arranged coaxially with the convex lens L1 on the side of the subject 100 with being apart from the convex lens L1 by a distance d. In this case, an effect of the concave lens L2 makes the focal length "$f_2$" of the second optical system OS2 different from the focal length "$f_1$" of the convex lens constituting the first optical system OS1. As described above, by making the configuration of the first optical system OS1 different from the configuration of the second optical system OS2, it is possible to make the focal length "$f_1$" of the first optical system OS1 and the focal length "$f_2$" of the second optical system OS2 different from each other. In this regard, the aspects of the first optical system OS1 and the second optical system OS2 shown in FIG. 5 are merely one example and the present invention is not limited thereto as long as the focal length "$f_1$" of the first optical system OS1 and the focal length "$f_2$" of the second optical system OS2 are different from each other.

Although the configurations of the first optical system OS1 and the second optical system OS2 are explained with referring to the aspect in which only the second optical system OS2 contains the concave lens L2 and the first optical system OS1 does not contain any concave lens as shown in FIG. 5 as the example, the present invention is not limited thereto. An aspect in which each of the first optical system OS1 and the second optical system OS2 contains one or more concave lens is also involved in the scope of the present invention. In this case, by adjusting the number, arrangements (for example, distances from other lenses) and focal lengths of the concave lenses contained in each of the first optical system OS1 and the second optical system OS2, it is possible to make the focal length "$f_1$" of the first optical system OS1 and the focal length "$f_2$" of the second optical system OS2 different from each other. With this configuration, the change of the magnification "$m_1$" of the first subject image with respect to the distance "a" to the subject 100 becomes different from the change of the magnification "$m_2$" of the second subject image with respect to the distance "a" to the subject 100.

As described above, the configurations and the arrangements of the first optical system OS1 and the second optical system OS2 in this embodiment may be any aspect as long as the above-described first condition ($f_1 \neq f_2$) is satisfied, and thereby the change of the magnification "$m_1$" of the first subject image with respect to the distance "a" to the subject 100 is different from the change of the magnification "$m_2$" of the second subject image with respect to the distance "a" to the subject 100.

Referring back to FIG. 4, the first lens actuator AF1 has a function of actuating (moving) at least one lens (such as a focusing lens) constituting the first optical system OS1 in the optical axis direction thereof in accordance with the control from the processor of the control part 2 to perform the focusing operation (or the automatic focusing operation) for the first optical system OS1. In the same manner, the second lens actuator AF2 has a function of actuating (moving) at least one lens (such as a focusing lens) constituting the second optical system OS2 in the optical axis direction thereof in accordance with the control from the processor of the control part 2 to perform the focusing operation (or the automatic focusing operation) for the second optical system OS2. Each of the first lens actuator AF1 and the second lens actuator AF2 is not particularly limited to a specific kind as long as it can perform the focusing operation for the first optical system OS1 or the second optical system OS2 in accordance with the control from the processor of the control part 2. For example, each of the first lens actuator AF1 and the second lens actuator AF2 can be constituted of an actuator such as a DC motor, a stepping motor and a voice coil motor.

In this regard, the processor of the control part 2 uses any automatic focusing technique such as a contrast automatic focusing technique and a phase difference automatic focusing technique to drive the first lens actuator AF1 and the second lens actuator AF2, thereby realizing the focusing operations for the first optical system OS1 and the second optical system OS2.

The imaging part S has a function of imaging the first subject image formed by the first optical system OS1 and the second subject image formed by the second optical system OS2 to obtain an image signal of the first subject image and an image signal of the second subject image. In this embodiment, the imaging part S includes the first image sensor S1 for imaging the first subject image to obtain the image signal of the first subject image and the second image sensor S2 for imaging the second subject image to obtain the image signal of the second subject image.

A distance from the rear principal point of the first optical system OS1 to the imaging surface of the first image sensor S1 is set so that the first subject image of the subject 100 located at an infinite distance point is formed on the imaging surface of the first image sensor S1 in an initial state that the focusing operation for the first optical system OS1 is not performed by the first lens actuator AF1 (in a state that the first optical system OS1 is illustrated by a dotted line in FIG. 4). In other words, the first optical system OS1 and the first image sensor S1 are arranged so as to focus on the infinite distance point in the initial state that the focusing operation for the first optical system OS1 is not performed by the first lens actuator AF1. Thus, in the initial state, the distance from the rear principal point of the first optical system OS1 to the imaging surface of the first image sensor S1 is equal to the focal length "$f_1$" of the first optical system OS1. Therefore, when the subject 100 is located at an arbitrary distance "a", at least one lens (such as a focusing lens) constituting the first optical system OS1 is moved in accordance with the control from the processor of the control part 2 and the front principal point and the rear principal point of the first optical system OS1 are shifted toward the side of the subject 100 by $\Delta b_1$. As a result, the subject 100 located at the arbitrary distance "a" is in focus.

As is the case for the first optical system OS1, a distance from the rear principal point of the second optical system OS2 to the imaging surface of the second image sensor S2 is set so that the second subject image of the subject 100 located at the infinite distance point is formed on the imaging surface of the second image sensor S2 in an initial state that the focusing operation for the second optical system OS2 is not performed by the second lens actuator AF2 (in a state that the second optical system OS2 is illustrated by a dotted line in FIG. 4). In other words, the second optical system OS2 and the second image sensor S2 are arranged so as to focus on the infinite distance point in the initial state that the focusing operation for the second optical system OS2 is not performed by the second lens actuator AF2. Thus, in the initial state, the distance from the rear principal point of the second optical system OS2 to the imaging surface of the second image sensor S2 is equal to the focal length "$f_2$" of the second optical system OS2. Therefore, when the subject 100 is located at the arbitrary distance "a", at least one lens (such as a focusing lens) constituting the second optical system OS2 is moved in accordance with the control from the processor of the control part 2 and the front principal point and the rear principal point of the second optical system OS2 are shifted toward the side of the subject 100 by Abe. As a result, the subject 100 located at the arbitrary distance "a" is in focus.

In this regard, although the first image sensor S1, the first lens actuator AF1 and the first optical system OS1 are provided in one housing and the second image sensor S2, the second lens actuator AF2 and the second optical system OS2 are provided in another housing in the aspect shown in FIG. 4, the present invention is not limited thereto. An aspect in which all of the first optical system OS1, the second optical system OS2, the first lens actuator AF1, the second lens actuator AF2, the first image sensor S1 and the second image sensor S2 are provided in one housing is also contained in the scope of the present invention.

Each of the first image sensor S1 and the second image sensor S2 may be a color image sensor (such as a color CCD image sensor or a color CMOS image sensor) having a color filter such as an RGB primary color filter and a CMY complementary color filter arranged in an arbitrary pattern such as a bayer pattern or a monochrome image sensor (such as a monochrome CCD image sensor or a monochrome CMOS image sensor) without such a color filter.

The first subject image is formed on the imaging surface of the first image sensor S1 by the first optical system OS1 and the color or monochrome image signal of the first subject image is obtained by the first image sensor S1. The obtained image signal of the first subject image is transmitted to the control part 2 and the distance calculating part 4 through the data bus 9. In the same manner, the second subject image is formed on the imaging surface of the second image sensor S2 by the second optical system OS2 and the color or monochrome image signal of the second subject image is obtained by the second image sensor S2. The obtained image signal of the second subject image is transmitted to the control part 2 and the distance calculating part 4 through the data bus 9. The image signal of the first subject image and the image signal of the second subject image transmitted to the distance calculating part 4 are used for calculating the distance "a" to the subject 100. On the other hand, the image signal of the first subject image and the image signal of the second subject image transmitted to the control part 2 are used for the image displaying due to the display part 6 and the communication of the image signals due to the communication part 8.

The association information storage part 3 is an arbitrary non-volatility storage medium (such as a hard disk and a flash memory) for storing the association information for associating the image magnification ratio "MR" ($m_2/m_1$)

between the magnification "$m_1$" of the first subject image and the magnification "$m_2$" of the second subject image with the distance "a" from the front principal point of the first optical system OS1 to the subject 100.

The association information stored in the association information storage part 3 is information for calculating the distance "a" from the front principal point of the first optical system OS1 to the subject 100 from the image magnification ratio "MR" ($m_2/m_1$) between the magnification "$m_1$" of the first subject image and the magnification "$m_2$" of the second subject image.

Typically, the association information stored in the association information storage part 3 contains the above equations (21) and (22) (or the general equations (15) and (16)) for calculating the distance "a" to the subject 100 based on the image magnification ratio "MR" and the above-described fixed values in these equations determined by the configurations and the arrangements of the first optical system OS1 and the second optical system OS2 (for example, the fixed values $f_1$ and $f_2$ for the above equations (21) and (22)). Alternatively, the association information stored in the association information storage part 3 may be a look-up table for uniquely associating the image magnification ratio "MR" with the distance "a" to the subject 100. By referring to such association information stored in the association information storage part 3, it becomes possible to calculate the distance "a" to the subject 100 based on the image magnification ratio "MR".

The distance calculating part 4 has a function of calculating the distance "a" to the subject 100 based on the first subject image and the second subject image imaged by the imaging part S. The distance calculating part 4 receives the image signal of the first subject image from the first image sensor S1 of the imaging part S and receives the image signal of the second subject image from the second image sensor S2 of the imaging part S.

After that, the distance calculating part 4 subjects a filtering process such as a Canny method to the image signal of the first subject image and the image signal of the second subject image to extract edge portions of the first subject image in the image signal of the first subject image and edge portions of the second subject image in the image signal of the second subject image. The distance calculating part 4 calculates a size (image width or image height) $Y_1$ of the first subject image based on the extracted edge portions of the first subject image and a size (image width or image height) $Y_2$ of the second subject image based on the extracted edge portions of the second subject image.

A method for calculating the size "$Y_1$" of the first subject image and the size "$Y_2$" of the second subject image based on the edge portions of the first subject image and the edge portions of the second subject image extracted by the distance calculating part 4 is not particularly limited to a specific method. For example, it may be possible to consider a distance between an uppermost edge portion and a lowest edge portion among the edge portions of the subject image in the image signal as the image height of the subject image or consider a distance between a leftmost edge portion and a rightmost edge portion among the edge portions of the subject image in the image signal as the image width of the subject image.

After that, the distance calculating part 4 uses the above equation (18) of "$MR=Y_2/Y_1$" to calculate the image magnification ratio "MR" between the magnification "$m_1$" of the first subject image and the magnification "$m_2$" of the second subject image based on the size "$Y_1$" of the first subject image and the size "$Y_2$" of the second subject image calculated as described above. After the image magnification ratio "MR" is calculated, the distance calculating part 4 refers to the association information stored in the association information storage part 3 to calculate (identify) the distance "a" to the subject 100 based on the calculated image magnification ratio "MR".

The three-dimensional image creating part 5 has a function of creating a three-dimensional image of the subject 100 based on the distance "a" to the subject 100 calculated by the distance calculating part 4 and the two-dimensional image of the subject 100 (that is the image signal of the first subject image or the image signal of the second subject image) obtained by the imaging part S. The words of "the three-dimensional image of the subject 100" means data in which the calculated distance "a" to the subject 100 is associated with pixels of the color or monochrome two-dimensional image (the normal image) of the subject 100.

The display part 6 is a panel type display part such as a liquid crystal display part. The display part 6 displays various information containing the two-dimensional image of the subject 100 (the image signal of the first subject image or the image signal of the second subject image) obtained by the imaging part S, the distance "a" to the subject 100 calculated by the distance calculating part 4, images such as the three-dimensional image of the subject 100 created by the three-dimensional image creating part 5 and information required for operating the distance measuring camera 1 in the form of characters or images in accordance with the control from the processor of the control part 2.

The operation part 7 is used for performing operations by the user of the distance measuring camera 1. The operation part 7 is not particularly limited to a specific kind as long as the user of the distance measuring camera 1 can uses the operation part 7 to performs the operations. For example, it is possible to employ a mouse, a keyboard, a numeric keypad, a button, a dial, a lever, a touch panel or the like as the operation part 7. The operation part 7 transmits signals respectively corresponding to the operations from the user using the distance measuring camera 1 to the processor of the control part 2.

The communication part 8 has a function of inputting data into the distance measuring camera 1 and/or outputting data from the distance measuring camera 1 to external devices. The communication part 8 may be connected to a network such as an internet. In this case, the distance measuring camera 1 can use the communication part 8 to perform communication with the external devices such as a web server and a data server provided outside the distance measuring camera 1.

As described above, in the distance measuring camera 1 of this embodiment, the first optical system OS1 and the second optical system OS2 are configured so that the focal length "$f_1$" of the first optical system OS1 and the focal length "$f_2$" of the second optical system OS2 are different from each other ($f_1 \neq f_2$), and thereby the change of the magnification "$m_1$" of the first subject image with respect to the distance "a" to the subject 100 and the change of the magnification "$m_2$" of the second subject image with respect to the distance "a" to the subject 100 are different from each other. Thus, the distance measuring camera 1 of this embodiment can uniquely calculate (identify) the distance "a" to the subject 100 based on the image magnification ratio "MR" ($m_2/m_1$) between the magnification "$m_1$" of the first subject image and the magnification "$m_2$" of the second subject image without using parallel disparities among a plurality of images and without projecting constant pattern light onto the subject 100.

Further, since the first optical system OS1 and the second optical system OS2 are configured so that the focal length "$f_1$" of the first optical system OS1 and the focal length "$f_2$" of the second optical system OS2 are different from each other in this embodiment, an angle of view and the magnification of the image signal of the first subject image obtained by the first image sensor S1 of the imaging part S are different from an angle of view and the magnification of the image signal of the second subject image obtained by the second image sensor S2 of the imaging part S. Thus, the distance measuring camera 1 of this embodiment can simultaneously and easily obtain the two image signals (the image signal of the first subject image and the image signal of the second subject image) having the different angles of view and the different magnifications. Such image signals having different angles of view and different magnifications can be utilized for various applications.

For example, since the distance measuring camera 1 of this embodiment can obtain the plurality of image signals having different angles of view and different magnifications, the distance measuring camera 1 of this embodiment can be preferably utilized in an iris authentication system. In a case of using the distance measuring camera 1 of this embodiment in the iris authentication system, it is possible to simultaneously obtain a wide-angle and low-magnification image of a face (or a whole-body) of an authentication target and a narrow-angle and high-magnification image of eyes of the authentication target. Thus, by using the distance measuring camera 1 of this embodiment, it is possible to perform an iris authentication for the eyes without using a camera having a zooming function. Thus, it is possible to reduce a size and a cost of the iris authentication system.

Further, the distance measuring camera 1 of this embodiment can be preferably utilized in a handler robot used for assembling or checking a precision device. At the time of driving the handler robot, it is required to calculate a distance to an assembly of an assembled target and obtain a wide-angle and low-magnification image used for roughly identifying a position of the assembly and a narrow-angle and high-magnification image used for accurately controlling a hand of the handler robot at the time of assembling the assembly. Since the distance measuring camera 1 of this embodiment can calculate the distance to the assembly (the subject) and simultaneously obtain the wide-angle and low-magnification image and the narrow-angle and high-magnification image, the distance measuring camera 1 of this embodiment is especially useful in the handler robot. Since the distance measuring camera 1 of this embodiment can provide three functions of calculating the distance to the assembly, obtaining the wide-angle and low-magnification image and obtaining the narrow-angle and high-magnification image, it is possible to reduce the number of cameras used in the handler robot by using the distance measuring camera 1 of this embodiment in the handler robot. Thus, it is possible to reduce a size and a cost of the handler robot.

Further, the distance measuring camera 1 of this embodiment can be preferably utilized for detecting occupants in a vehicle. By obtaining the wide-angle and low-magnification image with the distance measuring camera 1 of this embodiment, it is possible to realize vehicle occupant detection covering a wide area in the vehicle without using an additional camera. Thus, it is possible to reduce a size and a cost of a vehicle occupant detection system.

Second Embodiment

Figure 6:
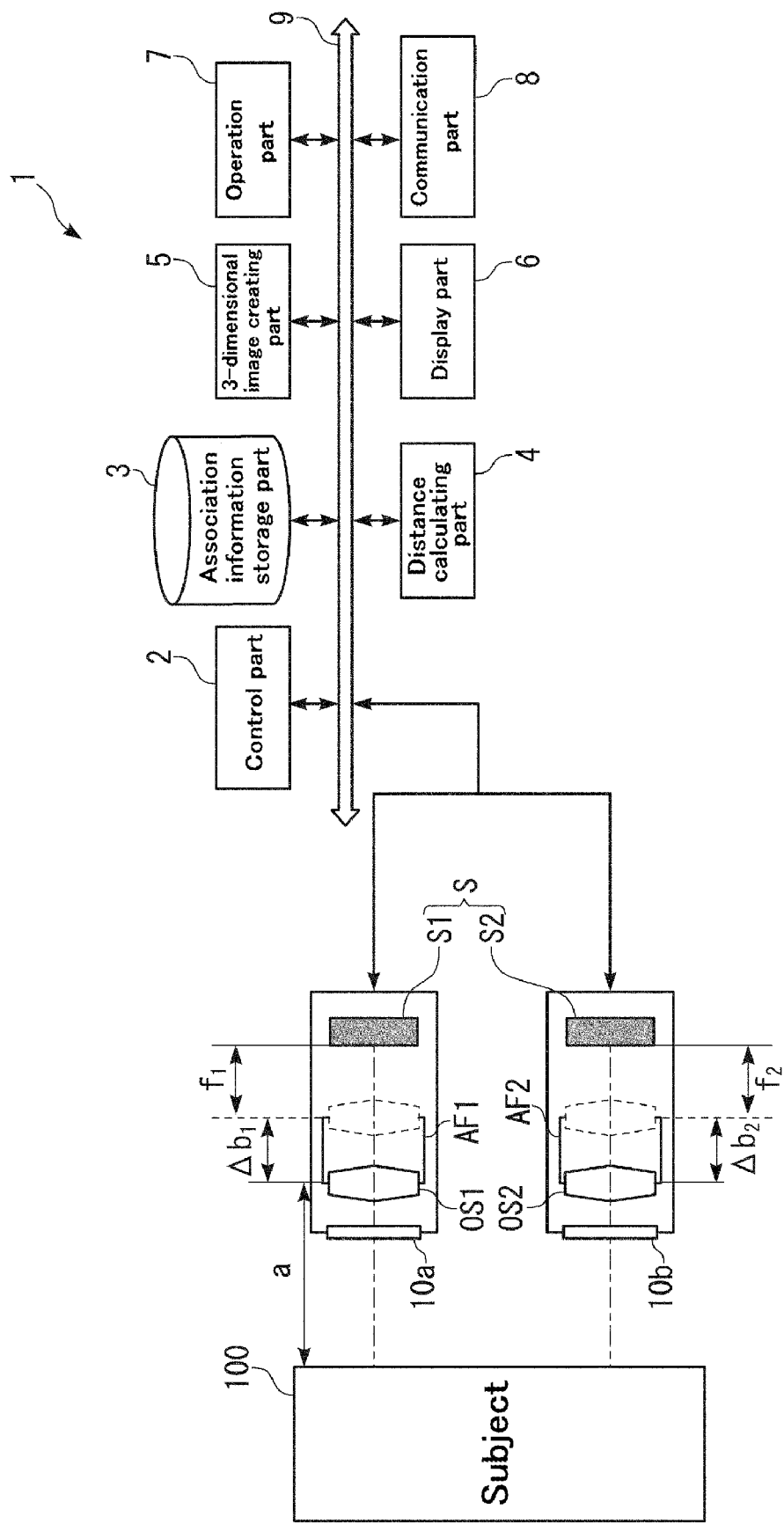
FIG. 6 is a block diagram schematically showing a distance measuring camera according to a second embodiment of the present invention.

Next, a distance measuring camera 1 according to a second embodiment of the present invention will be described in detail with reference to FIG. 6. FIG. 6 is a block diagram schematically showing the distance measuring camera according to the second embodiment of the present invention.

Hereinafter, the distance measuring camera 1 of the second embodiment will be described by placing emphasis on the points differing from the distance measuring camera 1 of the first embodiment, with the same matters being omitted from the description. The distance measuring camera 1 of the second embodiment is the same as the distance measuring camera 1 of the first embodiment except that a first bandpass filter 10a is arranged on a light path of the light collected on the imaging surface of the first image sensor S1 of the imaging part S by the first optical system OS1 and a second bandpass filter 10b is arranged on a light path of the light collected on the imaging surface of the image sensor S2 of the imaging part S by the second optical system OS2.

In this regard, although the first bandpass filter 10a is arranged on the front side of the first optical system OS1 (the side of the subject 100) and the second bandpass filter 10b is arranged on the front side of the second optical system OS2 (the side of the subject 100) in the aspect shown in FIG. 6, the present invention is not limited thereto. For example, an aspect in which the first bandpass filter 10a is arranged on the rear side of the first optical system OS1 (the side of the first image sensor S1) and the second bandpass filter 10b is arranged on the rear side of the second optical system OS2 (the side of the second image sensor S2) is also contained in the scope of the present invention.

The first bandpass filter 10a passes only light in a specific wavelength band of the light from the subject 100 collected on the imaging surface of the first image sensor S1 by the first optical system OS1. The second bandpass filter 10b passes only light in a specific wavelength band of the light from the subject 100 collected on the imaging surface of the second image sensor S2 by the second optical system OS2. The specific wavelength band of the light which can pass through the first bandpass filter 10a is different from the specific wavelength band of the light which can pass through the second bandpass filter 10b. Thus, the first image sensor S1 and the second image sensor S2 can respectively receive the light in the different wavelength bands.

In this regard, although each of the first image sensor S1 and the second image sensor S2 may be the color image sensor having the color filter such as the RGB primary color filter and the CMY complementary color filter arranged in the arbitrary pattern such as the bayer pattern or the monochrome image sensor without the color filter, it is preferable that each of the first image sensor S1 and the second image sensor S2 is the monochrome image sensor. By using the monochrome image sensor as each of the first image sensor S1 and the second image sensor S2, it is possible to prevent a light intensity of the light in the specific wavelength band which has passed through the first bandpass filter 10a or the second bandpass filter 10b from further reducing due to the color filter of the color image sensor.

As described above, since the first image sensor S1 and the second image sensor S2 can respectively receive the light in the different wavelength bands in this embodiment, it is possible to simultaneously obtain the two image signals (the image signal of the first subject image and the image signal of the second subject image) respectively formed by the light in the different wavelength bands. Thus, it is possible to use the distance measuring camera 1 for an application in which a plurality of image signals respectively formed by light in different wavelength bands can be preferably used. For example, it is possible to preferably use the distance measuring camera 1 for an iris authentication system or a dark-field occupant condition detection system of a vehicle-mounted camera.

Further, since the distance measuring camera 1 of this embodiment obtains the two image signals respectively formed by the light in the different wavelength bands, it is not necessary to use a plurality of light sources respectively emitting light in different wavelength bands. Thus, even if the distance measuring camera 1 is used in an application in which the plurality of image signals respectively formed by the light in the different wavelength bands as described above, it is possible to reduce a size and a cost of the distance measuring camera 1.

Third Embodiment

Figure 7:
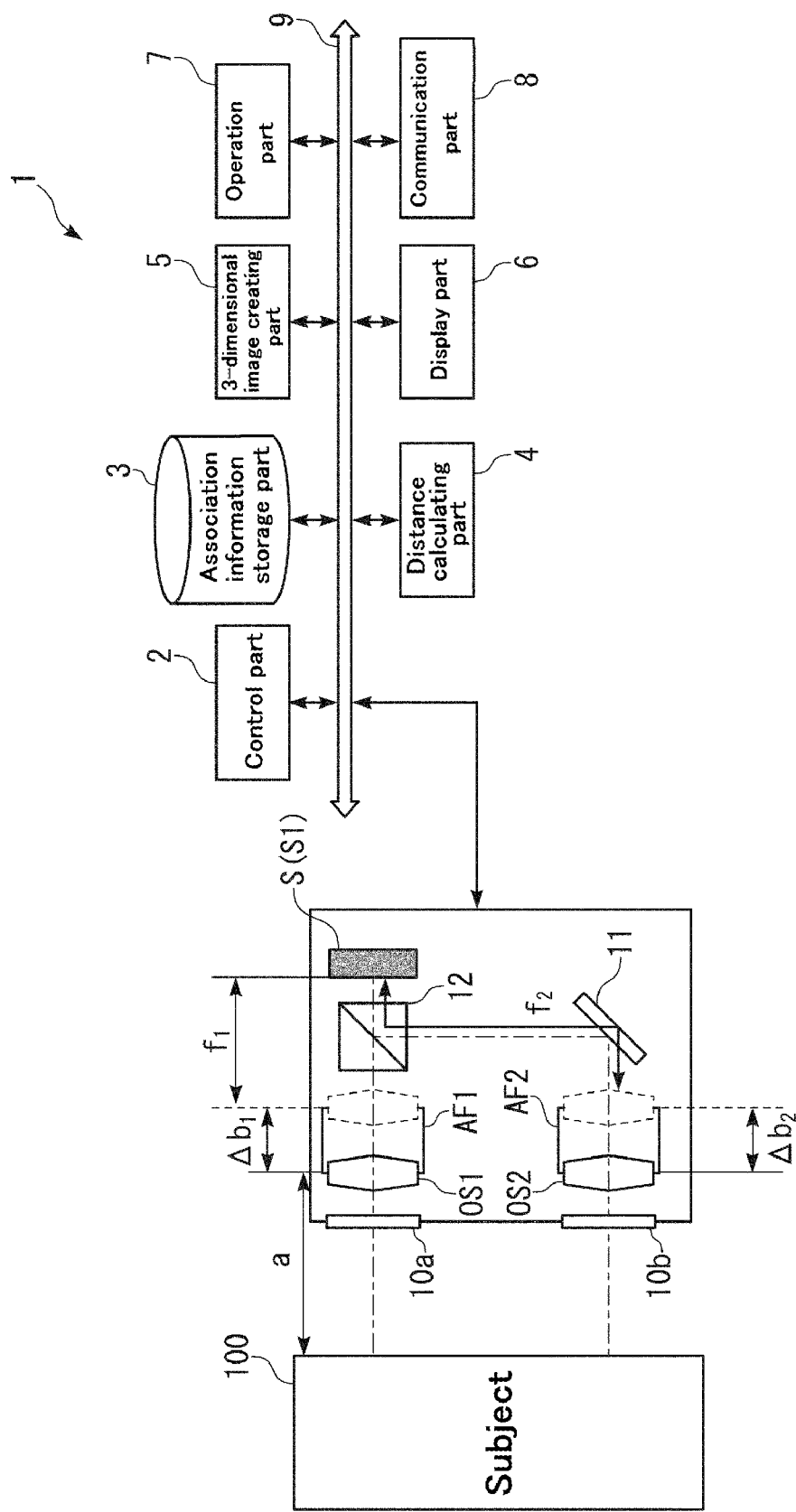
FIG. 7 is a block diagram schematically showing a distance measuring camera according to a third embodiment of the present invention.

Next, a distance measuring camera 1 of the third embodiment will be described in detail with reference to FIG. 7. FIG. 7 is a block diagram schematically showing the distance measuring camera according to the third embodiment of the present invention.

Hereinafter, the distance measuring camera 1 of the third embodiment will be described by placing emphasis on the points differing from the distance measuring camera 1 of the second embodiment, with the same matters being omitted from the description. The distance measuring camera 1 of the third embodiment is the same as the distance measuring camera 1 of the second embodiment except that the imaging part S is constituted of only the first image sensor S1, all of the first optical system OS1, the second optical system OS2, the first lens actuator AF1, the second lens actuator AF2, the first bandpass filter 10a, the second bandpass filter 10b and the first image sensor S1 are provided in one housing, a mirror 11 and a prism 12 are provided in the one housing and the first image sensor S1 is limited to the color image sensor.

As shown in FIG. 7, all of the first optical system OS1, the second optical system OS2, the first lens actuator AF1, the second lens actuator AF2, the first bandpass filter 10a, the second bandpass filter 10b and the first image sensor S1 are provided in the one housing in this embodiment. Further, the mirror 11 and the prism 12 are arranged on the light pass of the light collected by the second optical system OS2. The light passing through the second bandpass filter 10b and collected by the second optical system OS2 passes through the mirror 11 and the prism 12 and the image of the light is formed on the imaging surface of the first image sensor S1. With this configuration, the second subject image is formed on the imaging surface of the first image sensor S1.

Thus, both of the first subject image formed by the first optical system OS1 and the second optical system OS2 formed by the second optical system OS2 are formed on the imaging surface of the first image sensor S1 in the embodiment.

Further, in this embodiment, the first image sensor S1 is the color image sensor having the color filter such as the RGB primary color filter and the CMY complementary color filter arranged in the arbitrary pattern such as the bayer pattern. The wavelength band of the light which can pass through the first bandpass filter 10a corresponds to one of color filters (color elements) included in the first image sensor S1 and the wavelength band of the light which can pass through the second bandpass filter 10b corresponds to another one of the color filters included in the first image sensor S1.

With this configuration, one of the image signals corresponding to each color filter which are obtained by the first image sensor S1 (such as a red color image signal, a green color image signal and a blue color image signal) corresponds to the image signal of the first subject image and another one of the image signals obtained by the first image sensor S1 corresponds to the image signal of the second subject image. Thus, the first image sensor S1 can simultaneously and separately obtain the image signal of the first subject image and the image signal of the second subject image.

For example, in a case where the wavelength band of the light which can pass through the first bandpass filter 10a corresponds to a transparent wavelength band of a red color filter in the color filters included in the first image sensor S1, the red image signal obtained by the first image sensor S1 is the image signal of the first subject image. On the other hand, in a case where the wavelength band of the light which can pass through the second bandpass filter 10b corresponds to a transparent wavelength band of a green color filter in the color filters included in the first image sensor S1, the green image signal obtained by the first image sensor S1 is the image signal of the second subject image.

According to the above-described aspect, it is possible to configure the imaging part S with a single color image sensor (the first image sensor S1) which can image both of the first subject image formed by the first optical system OS1 and the second subject image formed by the second optical system OS2. Thus, it is possible to reduce the size and the cost of the distance measuring camera 1.

Fourth Embodiment

Figure 8:
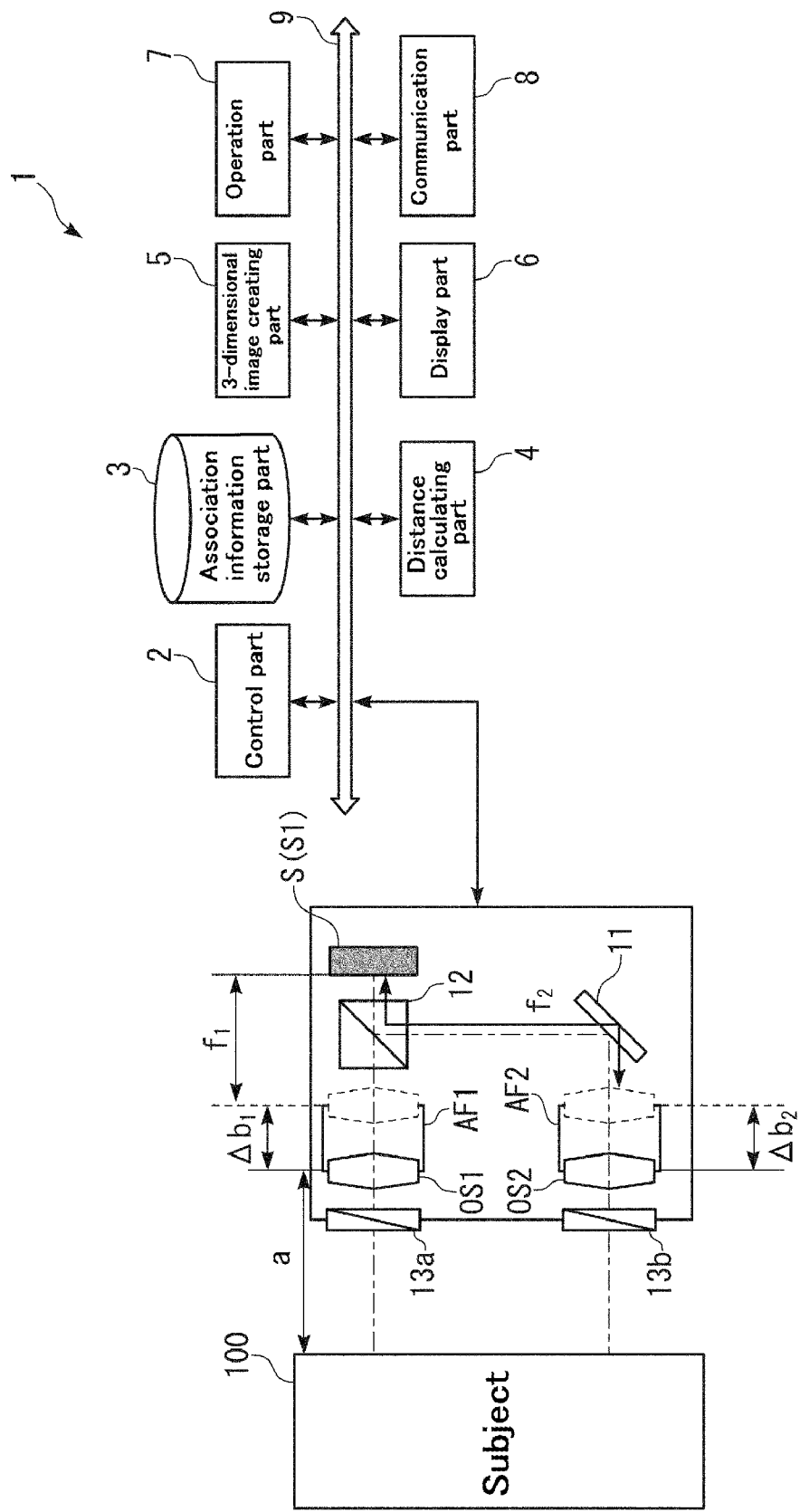
FIG. 8 is a block diagram schematically showing a distance measuring camera according to a fourth embodiment of the present invention.

Next, a distance measuring camera 1 according to a fourth embodiment of the present invention will be described in detail with reference to FIG. 8. FIG. 8 is a block diagram schematically showing the distance measuring camera according to the fourth embodiment of the present invention.

Hereinafter, the distance measuring camera 1 of the fourth embodiment will be described by placing emphasis on the points differing from the distance measuring camera 1 of the third embodiment, with the same matters being omitted from the description. The distance measuring camera 1 of the fourth embodiment is the same as the distance measuring camera 1 of the third embodiment except that the first bandpass filter 10a and the second bandpass filter 10b are omitted, a first shutter 13a and a second shutter 13b are provided in the one housing and the first image sensor S1 is not limited to the color image sensor.

As shown in FIG. 8, the first shutter 13a for blocking the light from the subject 100 from entering to the first optical system OS1 and the second shutter 13b for blocking the light from the subject 100 from entering to the second optical system OS2 are provided in the one housing in this embodiment. The first shutter 13a and the second shutter 13b are controlled by the processor of the control part 2 and opened and closed in accordance with the signal from the processor of the control part 2. The first shutter 13a and the second shutter 13b are controlled so that only one of them is opened. Thus, both of the first shutter 13a and the second shutter 13b are not opened at the same time.

When the first shutter 13a is opened, the light from the subject 100 enters to the first optical system OS1 and thus the first subject image is formed on the imaging surface of the image sensor S1. At this time, the first image sensor S1 obtains the image signal of the first subject image and transmits the image signal of the first subject image to the control part 2 and the distance calculating part 4.

On the other hand, when the second shutter 13b is opened, the light from the subject 100 enters to the second optical system OS2 and thus the second subject image is formed on the imaging surface of the image sensor S1 through the mirror 11 and the prism 12. At this time, the first image sensor S1 obtains the image signal of the second subject image and transmits the image signal of the second subject image to the control part 2 and the distance calculating part 4.

As described above, one of the first shutter 13a and the second shutter 13b is opened by the control from the processor of the control part 2 in this embodiment. With this control, the distance measuring camera 1 can separately obtain the image signal of the first subject image and the image signal of the second subject image.

Further, in this embodiment, it is possible to configure the imaging part S with the single color image sensor (the first image sensor S1) which can image both of the first subject image formed by the first optical system OS1 and the second subject image formed by the second optical system OS2. Thus, it is possible to reduce the size and the cost of the distance measuring camera 1.

Further, the first image sensor S1 may be the monochrome image sensor in this embodiment unlike the above-described third embodiment. By employing the monochrome image sensor as the first image sensor S1, it is possible to further reduce the cost of the distance measuring camera 1.

Fifth Embodiment

Figure 9:
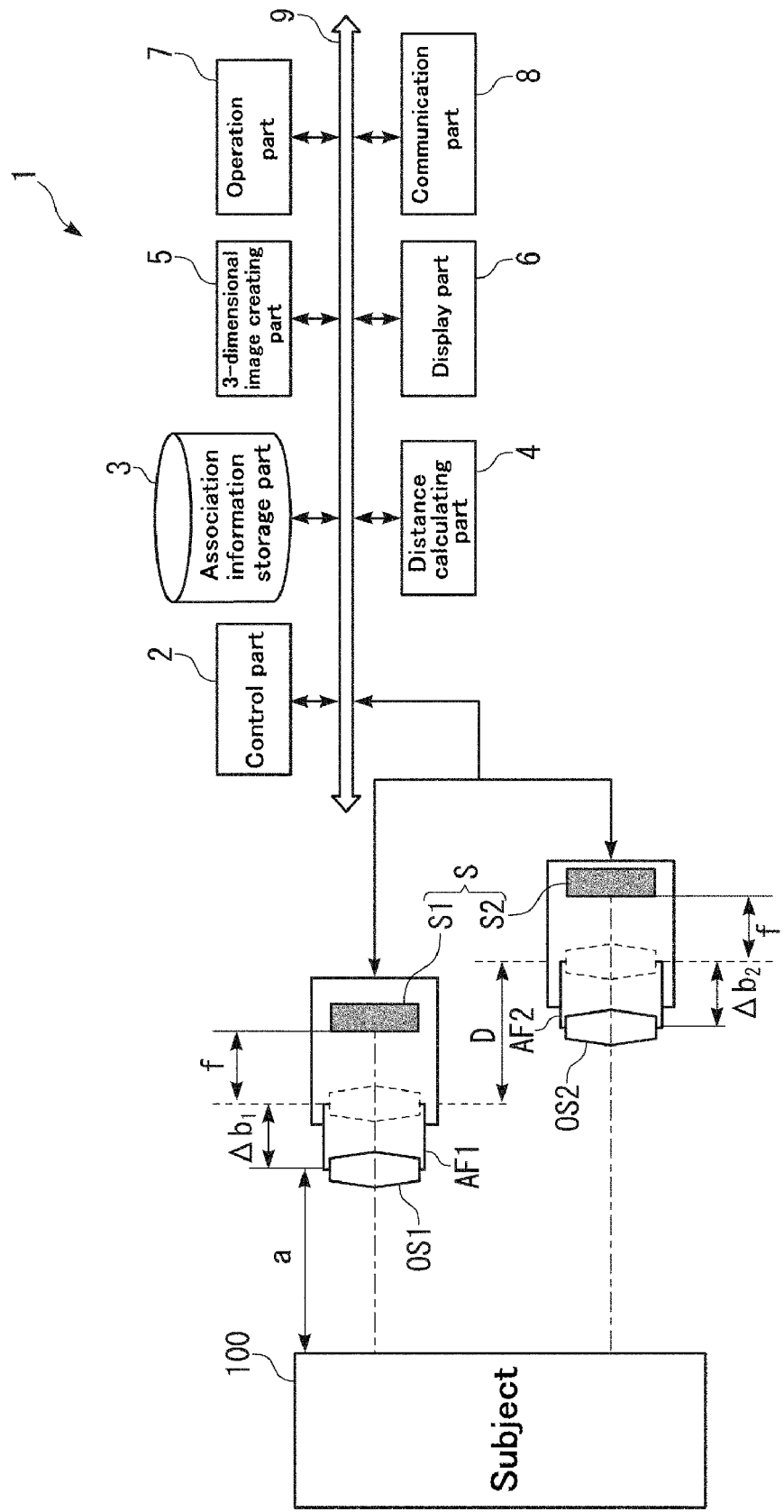
FIG. 9 is a block diagram schematically showing a distance measuring camera according to a fifth embodiment of the present invention.

Next, a distance measuring camera 1 according to a fifth embodiment of the present invention will be described in detail with reference to FIG. 9. FIG. 9 is a block diagram schematically showing the distance measuring camera according to the fifth embodiment of the present invention.

Hereinafter, the distance measuring camera 1 of the fifth embodiment will be described by placing emphasis on the points differing from the distance measuring camera 1 of the first embodiment, with the same matters being omitted from the description. The distance measuring camera 1 of the fifth embodiment is the same as the distance measuring camera 1 of the first embodiment except that the configurations and the arrangements of the first optical system OS1 and the second optical system OS2 are modified.

As shown in FIG. 9, the distance measuring camera 1 of this embodiment is characterized in that the first optical system OS1 and the second optical system OS2 are configured and arranged so as to satisfy the second condition of the above-described two conditions required for calculating the distance "a" to the subject 100 based on the image magnification ratio "MR". Namely, the distance measuring camera 1 of this embodiment is characterized in that the first optical system OS1 and the second optical system OS2 are configured and arranged so as to satisfy the second condition that the depth disparity "D" exists between the front principal point of the first optical system OS1 in the initial state that the first lens actuator AF1 does not perform the focusing operation and the front principal point of the second optical system OS2 in the initial state that the second lens actuator AF2 does not perform the focusing operation (D≠0). On the other hand, in this embodiment, the first optical system OS1 and the second optical system OS2 are configured and arranged so as not to satisfy the above-described first condition ($f_1 \neq f_2$). Further, in the distance measuring camera 1, the first optical system OS1 and the second optical system OS2 are configured so as to satisfy the third condition and the fourth condition described above.

Thus, the above general equations (15) and (16) for calculating the distance "a" from the front principal point of the first optical system OS1 to the subject 100 based on the image magnification ratio "MR" are simplified by the condition of "$f_1=f_2=f$" and can be respectively expressed by the following equations (23) and (24).

Equation 23

$$a = \frac{MR \cdot D + 2f \cdot (1 - MR) + \sqrt{4f^2 \cdot MR \cdot (1 - MR)^2 + D^2 \cdot MR^2}}{2(1 - MR)} \quad (23)$$

Equation 24

$$a = \frac{MR \cdot D + 2f \cdot (1 - MR) - \sqrt{4f^2 \cdot MR \cdot (1 - MR)^2 + D^2 \cdot MR^2}}{2(1 - MR)} \quad (24)$$

In this regard, the relationship between the focal length "$f_1$" of the first optical system OS1 and the focal length "$f_2$" of the second optical system OS2 inevitably meets the condition branch (1) of "$f_2 <= f_1$" because the focal length "$f_1$" of the first optical system OS1 is equal to the focal length "$f_2$" of the second optical system OS2 ($f_1=f_2=f$). Thus, the solution expressed by the above equation (23) is proper as the distance "a". Therefore, the solution expressed by the above equation (23) is used as the distance "a" to the subject 100.

As described above, in the distance measuring camera 1 of this embodiment, the first optical system OS1 and the second optical system OS2 are configured and arranged so that the depth disparity "D" exists between the front principal point of the first optical system OS1 in the initial state that the first lens actuator AF1 does not perform the focusing operation and the front principal point of the second optical system OS2 in the initial state that the second lens actuator AF2 does not perform the focusing operation (D≠0). With this configuration, the first optical system OS1 and the second optical system OS2 are configured so that the change of the magnification "$m_1$" of the first subject image formed by the first optical system OS1 with respect to the distance "a" to the subject 100 is different from the change of the magnification "$m_2$" of the second subject image formed by the second optical system OS2 with respect to the distance "a" to the subject 100. Thus, the distance measuring camera 1 of this embodiment can uniquely calculate the distance "a" to the subject 100 based on the image magnification ratio "MR" ($m_2/m_1$) between the magnification "$m_1$" of the first subject image and the magnification "$m_2$" of the second subject image.

According to this embodiment, it is also possible to provide the same effect as the above-described first embodiment. In this regard, the configurations and the arrangements of the first optical system OS1 and the second optical system OS2 in this embodiment may be any aspect as long as the above-described second condition (D≠0) is satisfied, and thereby the change of the magnification "$m_1$" of the first subject image with respect to the distance "a" to the subject 100 is different from the change of the magnification "$m_2$" of the second subject image with respect to the distance "a" to the subject 100.

Sixth Embodiment

Figure 10:
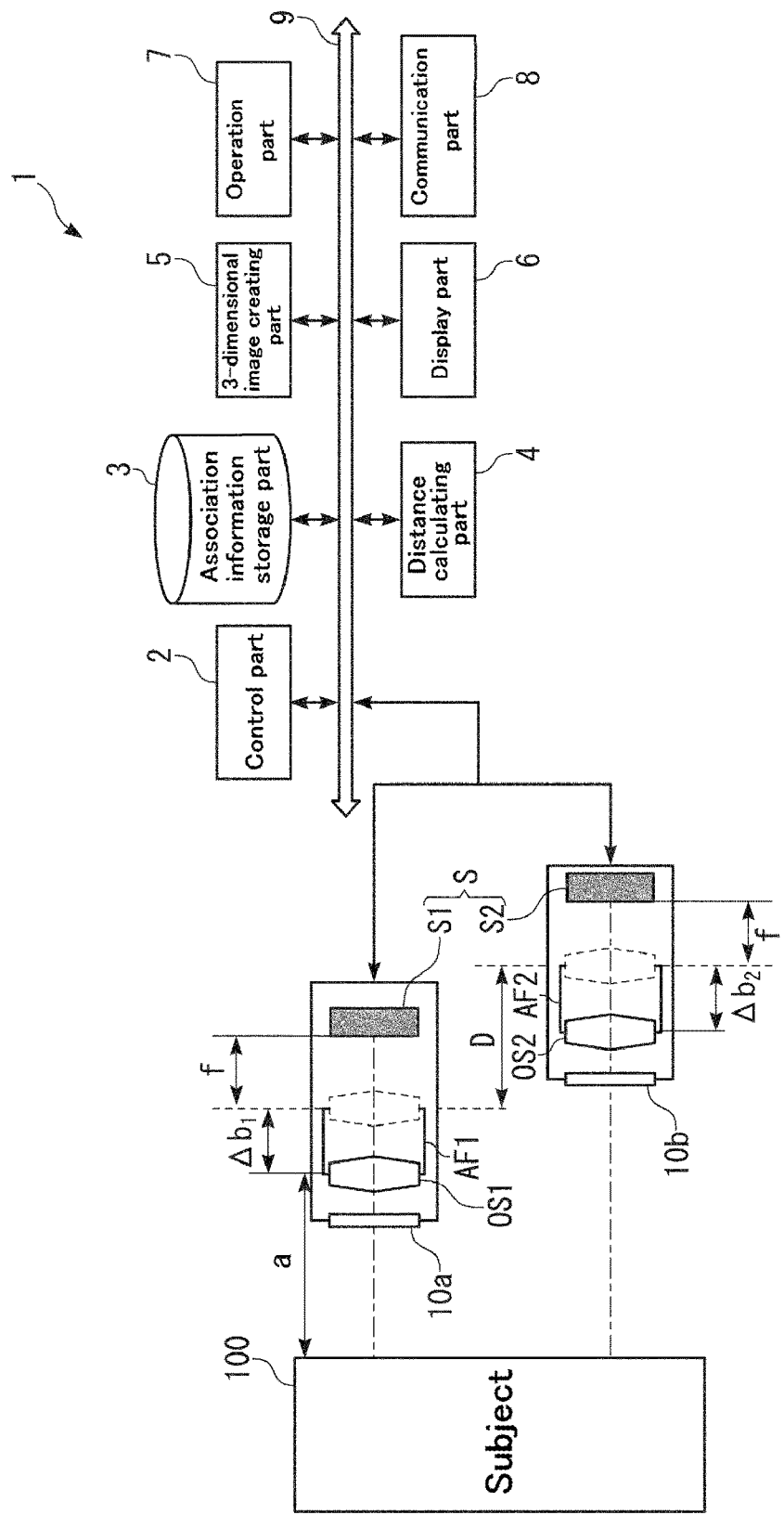
FIG. 10 is a block diagram schematically showing a distance measuring camera according to a sixth embodiment of the present invention.

Next, a distance measuring camera 1 according to a sixth embodiment of the present invention will be described in detail with reference to FIG. 10. FIG. 10 is a block diagram schematically showing the distance measuring camera according to the sixth embodiment of the present invention.

Hereinafter, the distance measuring camera 1 of the sixth embodiment will be described by placing emphasis on the points differing from the distance measuring camera 1 of the fifth embodiment, with the same matters being omitted from the description. The difference points between the distance measuring camera 1 of this embodiment and the distance measuring camera 1 of the fifth embodiment are the same as the difference points between the distance measuring camera 1 of the second embodiment and the distance measuring camera 1 of the first embodiment. Namely, the distance measuring camera 1 of the sixth embodiment is the same as the distance measuring camera 1 of the fifth embodiment except that the first bandpass filter 10a is arranged on the light path of the light collected on the imaging surface of the first image sensor S1 of the imaging part S by the first optical system OS1 and the second bandpass filter 10b is arranged on the light path of the light collected on the imaging surface of the image sensor S2 of the imaging part S by the second optical system OS2.

As is the case for the second embodiment, the first bandpass filter 10a passes only light in the specific wavelength band of the light from the subject 100 collected on the imaging surface of the first image sensor S1 by the first optical system OS1 as shown in FIG. 10. The second bandpass filter 10b passes only light in the specific wavelength band of the light from the subject 100 collected on the imaging surface of the second image sensor S2 by the second optical system OS2. Further, the specific wavelength band of the light which can pass through the first bandpass filter 10a is different from the specific wavelength band of the light which can pass through the second bandpass filter 10b. Thus, the first image sensor S1 and the second image sensor S2 can respectively receive the light in the different wavelength bands.

As described above, since the first image sensor S1 and the second image sensor S2 can respectively receive the light in the different wavelength bands in this embodiment, it is possible to simultaneously obtain the two image signals (the image signal of the first subject image and the image signal of the second subject image) respectively formed by the light in the different wavelength bands as is the case for the second embodiment. Thus, it is possible to use the distance measuring camera 1 for the application in which the plurality of image signals respectively formed by the light in different wavelength bands can be preferably used. For example, it is possible to preferably use the distance measuring camera 1 for the iris authentication system or the dark-field occupant condition detection system of the vehicle-mounted camera.

Further, since the distance measuring camera 1 of this embodiment obtains the two image signals respectively formed by the light in the different wavelength bands, it is not necessary to use the plurality of light sources respectively emitting light in different wavelength bands as is the case for the second embodiment. Thus, even if the distance measuring camera 1 is used in an application in which the plurality of image signals respectively formed by the light in the different wavelength bands as described above, it is possible to reduce the size and the cost of the distance measuring camera 1.

Seventh Embodiment

Figure 11:
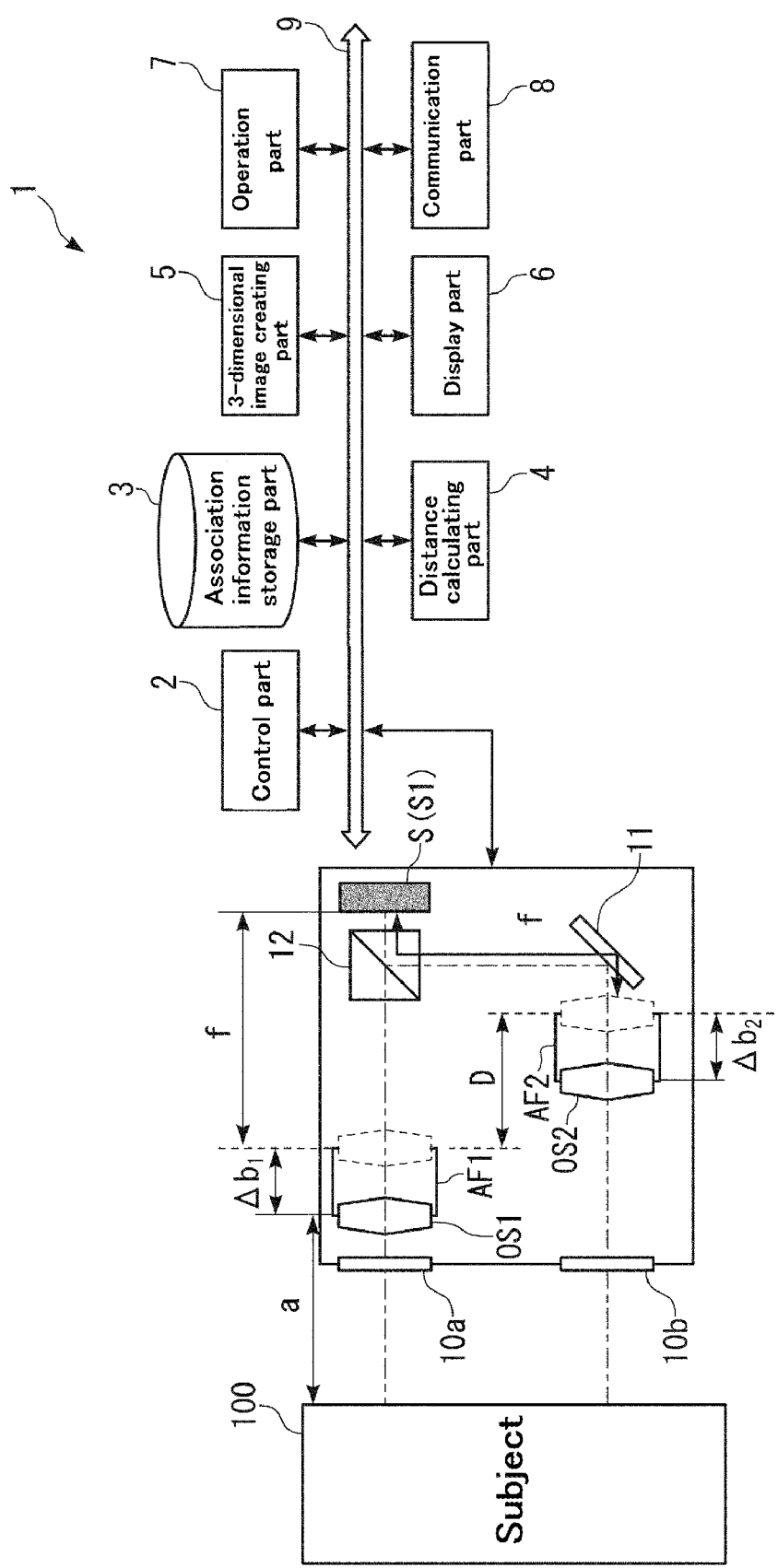
FIG. 11 is a block diagram schematically showing a distance measuring camera according to a seventh embodiment of the present invention.

Next, a distance measuring camera 1 according to a seventh embodiment of the present invention will be described in detail with reference to FIG. 11. FIG. 11 is a block diagram schematically showing the distance measuring camera according to the seventh embodiment of the present invention.

Hereinafter, the distance measuring camera 1 of the seventh embodiment will be described by placing emphasis on the points differing from the distance measuring camera 1 of the sixth embodiment, with the same matters being omitted from the description. The difference points between the distance measuring camera 1 of this embodiment and the distance measuring camera 1 of the sixth embodiment are the same as the difference points between the distance measuring camera 1 of third embodiment and the distance measuring camera 1 of the second embodiment. Namely, the distance measuring camera 1 of the seventh embodiment is the same as the distance measuring camera 1 of the sixth embodiment except that the imaging part S is constituted of only the first image sensor S1, all of the first optical system OS1, the second optical system OS2, the first lens actuator AF1, the second lens actuator AF2, the first bandpass filter 10a, the second bandpass filter 10b and the first image sensor S1 are provided in the one housing, the mirror 11 and the prism 12 are provided in the one housing and the first image sensor S1 is limited to the color image sensor.

As shown in FIG. 11, all of the first optical system OS1, the second optical system OS2, the first lens actuator AF1, the second lens actuator AF2, the first bandpass filter 10a, the second bandpass filter 10b and the first image sensor S1 are provided in the one housing as is the case for the third embodiment. Further, the mirror 11 and the prism 12 are arranged on the light pass of the light collected by the second optical system OS2. The light passing through the second bandpass filter 10b and collected by the second optical system OS2 passes through the mirror 11 and the prism 12 and the image of the light is formed on the imaging surface of the first image sensor S1. With this configuration, the second subject image is formed on the imaging surface of the first image sensor S1.

Further, as is the case for the third embodiment, the first image sensor S1 is the color image sensor having the color filter such as the RGB primary color filter and the CMY complementary color filter arranged in the arbitrary pattern such as the bayer pattern. The wavelength band of the light which can pass through the first bandpass filter 10a corresponds to one of the color filters (the color elements) included in the first image sensor S1 and the wavelength band of the light which can pass through the second bandpass filter 10b corresponds to another one of the color filters included in the first image sensor S1.

With this configuration, one of the image signals corresponding to each color filter which are obtained by the first image sensor S1 (such as the red color image signal, the green color image signal and the blue color image signal) corresponds to the image signal of the first subject image and another one of the image signals obtained by the first image sensor S1 corresponds to the image signal of the second subject image. Thus, the first image sensor S1 can simultaneously and separately obtain the image signal of the first subject image and the image signal of the second subject image.

Eighth Embodiment

Figure 12:
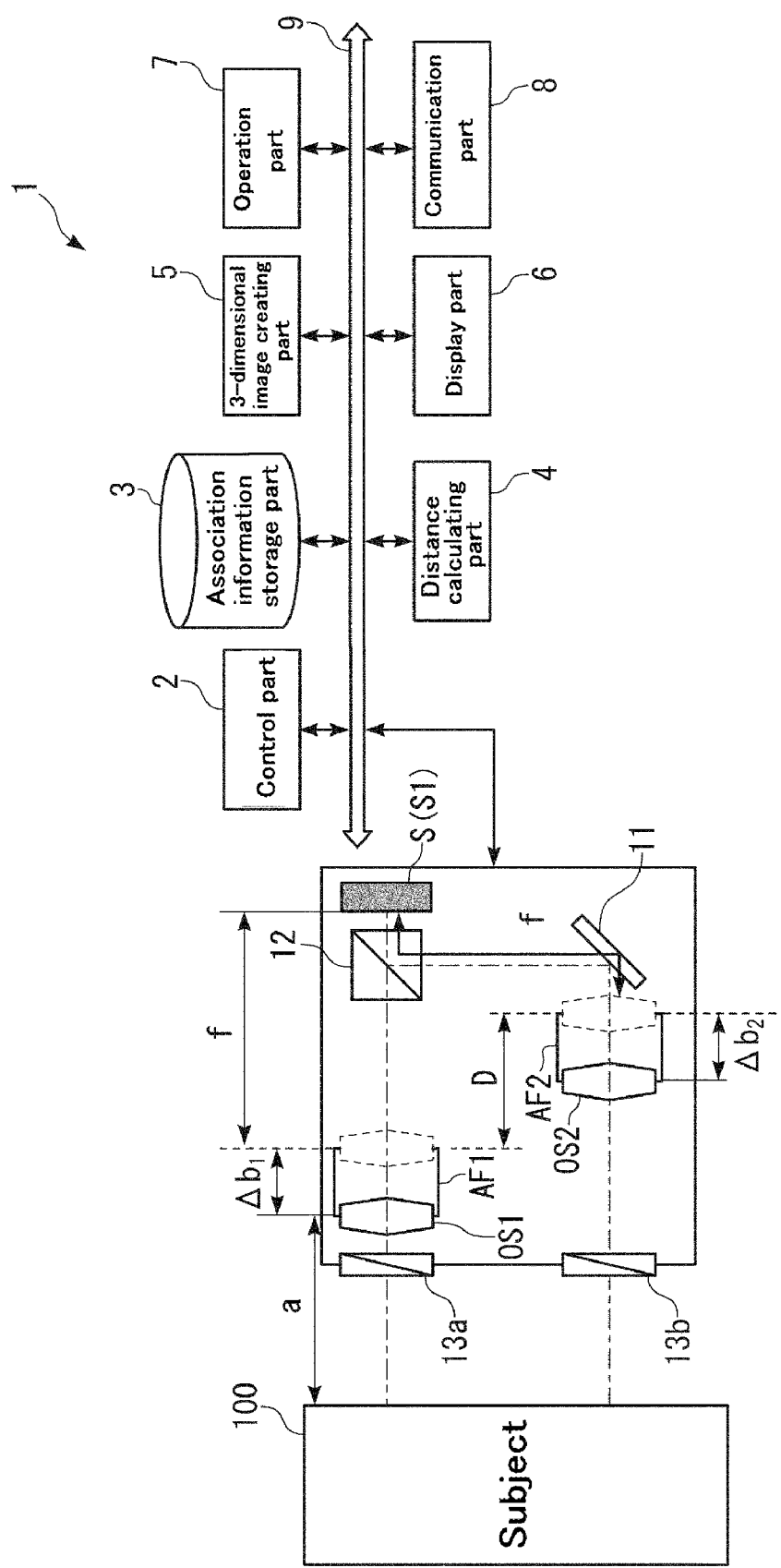
FIG. 12 is a block diagram schematically showing a distance measuring camera according to an eighth embodiment of the present invention.

Next, a distance measuring camera 1 according to an eighth embodiment of the present invention will be described in detail with reference to FIG. 12. FIG. 12 is a block diagram schematically showing the distance measuring camera according to the eighth embodiment of the present invention.

Hereinafter, the distance measuring camera 1 of the eighth embodiment will be described by placing emphasis on the points differing from the distance measuring camera 1 of the seventh embodiment, with the same matters being omitted from the description. The difference points between the distance measuring camera 1 of this embodiment and the distance measuring camera 1 of the seventh embodiment are the same as the difference points between the distance measuring camera 1 of fourth embodiment and the distance measuring camera 1 of the third embodiment. Namely, the distance measuring camera 1 of the eighth embodiment is the same as the distance measuring camera 1 of the seventh embodiment except that the first bandpass filter 10a and the second bandpass filter 10b are omitted, the first shutter 13a and the second shutter 13b are provided in the one housing and the first image sensor S1 is not limited to the color image sensor.

As shown in FIG. 12, the first shutter 13a for blocking the light from the subject 100 from entering to the first optical system OS1 is arranged on the front side of the first optical system OS1 (the side of the subject 100) and the second shutter 13b for blocking the light from the subject 100 from entering to the second optical system OS2 is arranged on the front side of the second optical system OS2 as is the case for the fourth embodiment.

Since the first shutter 13a and the second shutter 13b perform the same operations as the above-described fourth embodiment, the distance measuring camera 1 can separately obtain the image signal of the first subject image and the image signal of the second subject image.

As described above, in this embodiment, it is possible to configure the imaging part S with the single color image sensor (the first image sensor S1) which can image both of the first subject image formed by the first optical system OS1 and the second subject image formed by the second optical system OS2 as is the case for the fourth embodiment. Thus, it is possible to reduce the size and the cost of the distance measuring camera 1.

As described above with reference to each embodiment, the distance measuring camera 1 can uniquely calculate the distance "a" to the subject 100 based on the image magnification ratio "MR" ($m_2/m_1$) between the magnification "$m_1$" of the first subject image and the magnification "$m_2$" of the second subject image without using the parallel disparities among the plurality of images and without using projecting the constant pattern light onto the subject 100.

Thus, in the distance measuring camera 1 of the present invention, it is not necessary to ensure a large parallel disparity unlike the conventional stereo camera type distance measuring camera using the parallel disparities among the plurality of images. Thus, even if the first optical system OS1 and the second optical system OS2 are arranged so as to be close to each other, it is possible to accurately calculate the distance "a" to the subject 100. As a result, it is possible to reduce the size of the distance measuring camera 1 compared with the conventional stereo camera type distance measuring camera. Further, since it becomes unnecessary to design the distance measuring camera with considering the parallel disparities, it is possible to enhance the flexibility of design for the distance measuring camera 1.

Further, in the distance measuring camera 1 of the present invention, it is not necessary to use the special light source such as the projector for projecting the constant pattern light onto the subject 100 unlike the conventional pattern projection type distance measuring camera. Thus, it is possible to simplify the system configuration of the distance measuring camera 1. As a result, it is possible to realize downsizing, power-serving and cost-reducing of the distance measuring camera 1 compared with the conventional pattern projection type distance measuring camera.

In this regard, although the two optical systems (the first optical system OS1 and the second optical system OS2) are used in each embodiment described above, the number of the optical systems is not limited thereto. For example, an aspect in which an additional optical system is used in addition to the first optical system OS1 and the second optical system OS2 is also contained in the scope of the present invention. In this case, the additional optical system is configured and arranged so that a change of a magnification of a subject image formed by the additional optical system with respect to the distance "a" to the subject 100 becomes different from the change of the magnification "$m_1$" of the first subject image with respect to the distance "a" to the subject 100 and the change of the magnification "$m_2$" of the second subject image with respect to the distance "a" to the subject 100.

Further, although the first optical system OS1 and the second optical system OS2 are configured and arranged so as to satisfy one of the first condition and the second condition described above, the third condition and the fourth condition required for calculating the distance "a" to the subject 100 based on the image magnification ratio "MR" in each embodiment, an aspect in which the first optical system OS1 and the second optical system OS2 are configured and arranged so as to satisfy all of the first condition to the fourth condition (for example, the aspect in which the first optical system OS1 and the second optical system OS2 are configured and arranged as shown in FIG. 1) is also contained in the scope of the present invention.

Distance Measuring Method

Figure 13:
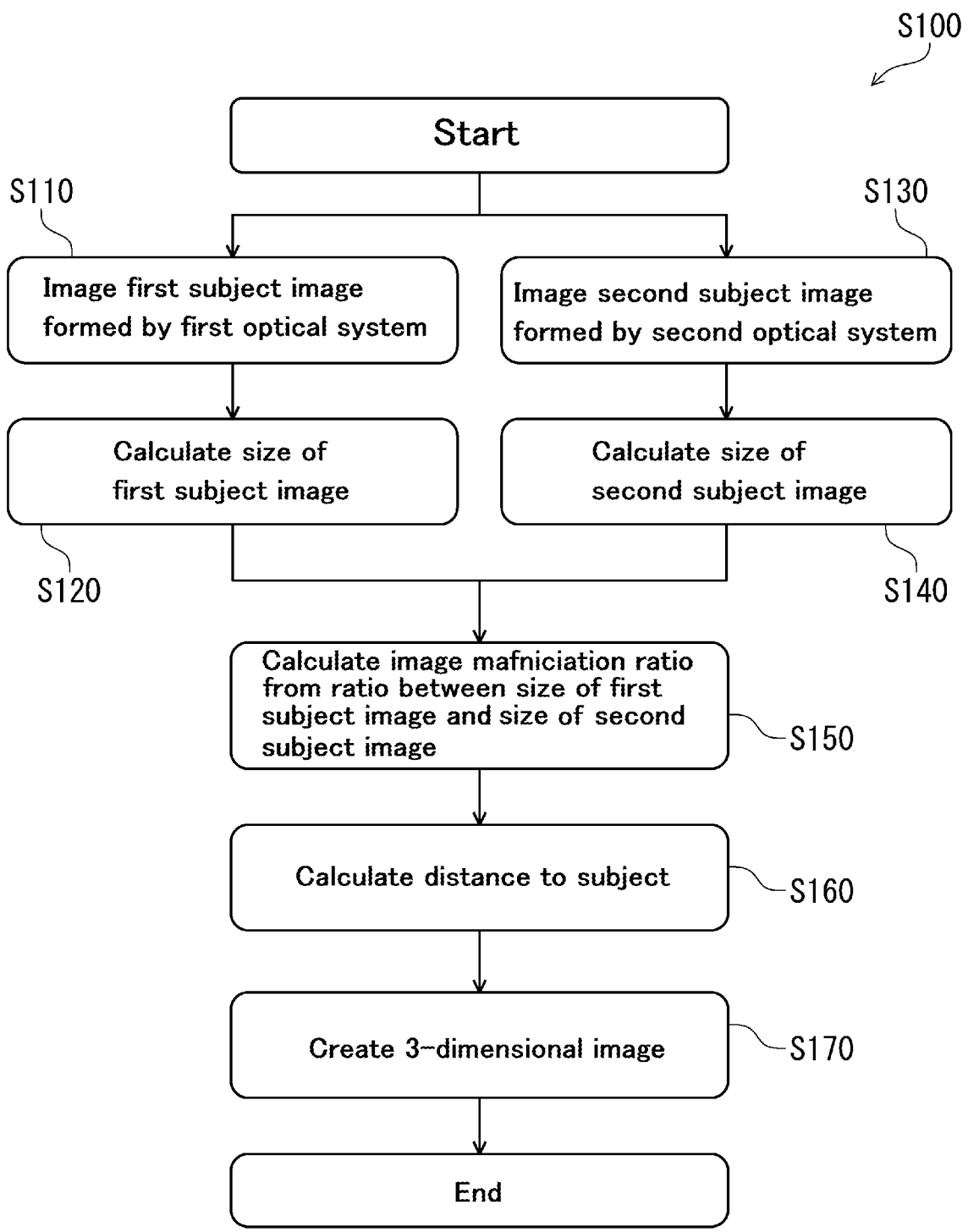
FIG. 13 is a flowchart for explaining a distance measuring method performed by the distance measuring camera of the present invention.

Next, description will be given to a distance measuring method performed by the distance measuring camera 1 of the present invention with reference to FIG. 13. FIG. 13 is a flowchart for explaining the distance measuring method performed by the distance measuring camera of the present invention. In this regard, although the distance measuring method explained in detail in the following description can be performed with the distance measuring cameras 1 according to the first embodiment to the eighth embodiment described above and an arbitrary device having the same function as the distance measuring cameras 1, the distance measuring method will be described with assuming that the distance measuring method is performed with the distance measuring camera 1 according to the first embodiment for the purpose of illustration.

A distance measuring method S100 shown in FIG. 13 starts when the user of the distance measuring camera 1 uses the operation part 7 to perform the operation for measuring the distance "a" to the subject 100. At a step S110, the first lens actuator AF1 is driven in accordance with the control from the processor of the control part 2 to perform the focusing operation for the first optical system OS1 for focusing on the subject 100. After that, the first subject image formed by the first optical system OS1 is imaged by the first image sensor S1 of the imaging part S and the image signal of the first subject image is obtained. The image signal of the first subject image is transmitted to the control part 2 and the distance calculating part 4 through the data bus 9. At a step S120, the distance calculating part 4 calculates the size (image height or image width) $Y_1$ of the first subject image from the received image signal of the first subject image.

On the other hand, at a step S130, the second lens actuator AF2 is driven in accordance with the control from the processor of the control part 2 to perform the focusing operation for the second optical system OS2 for focusing on the subject 100. After that, the second subject image formed by the second optical system OS2 is imaged by the second image sensor S2 of the imaging part S and the image signal of the second subject image is obtained. The image signal of the second subject image is transmitted to the control part 2 and the distance calculating part 4 through the data bus 9. At a step S140, the distance calculating part 4 calculates the size (image height or image width) $Y_2$ of the second subject image from the received image signal of the second subject image.

In this regard, the obtaining of the image signal of the first subject image at the step S110 and the calculating the size "$Y_1$" of the first subject image at the step S120 may be performed simultaneously with or separately from the obtaining of the image signal of the second subject image at the step S130 and the calculating the size "$Y_2$" of the second subject image at the step S140.

When both of the size "$Y_1$" of the first subject image and the size "$Y_2$" of the second subject image are calculated, the process shifts to a step S150. At the step S150, the distance calculating part 4 calculates the image magnification ratio "MR" between the magnification "$m_1$" of the first subject image and the magnification "$m_2$" of the second subject image from the size "$Y_1$" of the first subject image and the size "$Y_2$" of the second subject image based on the above equation (18) of "$MR=Y_2/Y_1$".

Next, at a step S160, the distance calculating part 4 refers to the association information stored in the association information storage part 3 to calculate (identify) the distance "a" to the subject 100 based on the calculated image magnification ratio "MR". After the distance "a" to the subject 100 is calculated at the step S160, the process shifts to a step S170.

At the step S170, the three-dimensional image creating part 5 creates the three-dimensional image of the subject 100 based on the distance "a" to the subject 100 calculated by the distance calculating part 4 and the two-dimensional image of the subject 100 (the image signal of the first subject image or the image signal of the second subject image) obtained by the imaging part S. After that, the two-dimensional image of the subject 100, the distance "a" to the subject 100 and/or the three-dimensional image of the subject 100 obtained in the preceding steps are displayed on the display part 6 or transmitted to the external devices by the communication part 8 and then the distance measuring method S100 finishes.

Although the distance measuring camera of the present invention has been described based on the embodiments shown in the accompanying drawings in the above description, the present invention is not limited thereto. The configuration of each component of the present invention may be possibly replaced with other arbitrary configurations having equivalent functions. Further, it may be also possible to add other arbitrary components to the configuration of the present invention.

Persons having ordinary skill in the art and technology of the present invention would perform alterations and changes in the described configuration of the distance measuring camera of the present invention without meaningfully departing from the principle, spirit and scope of the present invention and the distance measuring camera having the modified or changed configuration is also contained in the scope of the present invention.

For example, the number and the kind of the components of the distance measuring camera 1 shown in FIGS. 4 and 6 to 12 are merely provided for the illustration of the present invention, the present invention is not necessarily limited thereto. The scope of the present invention contains alternations and changes of the described configuration in which arbitrary components are added or combined or arbitrary components are omitted without meaningfully departing from the principle and the spirit of the present invention. Further, each component of the distance measuring camera 1 may be practiced in the manner of hardware, in the manner of software or in the manner of the combination of hardware and software.

Further, the number and the kind of the steps of the distance measuring method S100 shown in FIG. 13 are merely provided for the illustration of the present invention, the present invention is not necessarily limited thereto. The scope of the present invention contains alternations and changes of the described configuration in which arbitrary steps are added or combined or arbitrary steps are omitted without meaningfully departing from the principle and the spirit of the present invention.

Examples of Application

Examples of application of the distance measuring camera 1 are not particularly limited to specific kinds. For example, it is possible to use the distance measuring camera 1 for photographing a portrait of the subject and obtaining the three-dimensional image of the face of the subject. In such an example of application, it is preferable that the distance measuring camera 1 of the present invention is incorporated in a mobile device such as a smartphone and a mobile phone.

Further, the distance measuring camera 1 of the present invention can be utilized in a handler robot used for assembling or checking a precision device. Since the distance measuring camera 1 of the present invention can calculate a distance from a main body or an arm of the handler robot to the precision device or an assembly of the precision device at the time of assembling the precision device, it becomes possible to accurately grip the assembly with a gripping portion of the handler robot.

Further, since the distance measuring camera 1 of the present invention 1 can measure the distance to the subject, it is possible to obtain three-dimensional information of the subject. Such three-dimensional information of the subject can be utilized for producing a three-dimensional structure due to a three-dimensional printer.

Further, by utilizing the distance measuring camera 1 of the present invention in a vehicle, it is possible to measure a distance from the vehicle to an arbitrary object such as a pedestrian or an obstacle. Information on the calculated distance to the arbitrary object can be used for an automatic breaking system and an automatic driving system of the vehicle.

INDUSTRIAL APPLICABILITY

According to the present invention, it is possible to calculate the distance to the subject based on the image magnification ratio "MR" ($m_2/m_1$) between the magnification "$m_1$" of the first subject image and the magnification "$m_2$" of the second subject image without using the parallel disparities among the plurality of images. Thus, even if the first optical system and the second optical system are arranged so as to be close to each other, it is possible to accurately calculate the distance "a" to the subject. As a result, it is possible to reduce the size of the distance measuring camera compared with the conventional stereo camera type distance measuring camera. Further, according to the present invention, it is possible to calculate the distance to the subject based on the image magnification ratio "MR" ($m_2/m_1$) between the magnification "$m_1$" of the first subject image and the magnification "$m_2$" of the second subject image without projecting the constant pattern onto the subject. Thus, it is possible to simplify the system configuration of the distance measuring camera. As a result, it is possible to realize downsizing, power-serving and cost-reducing of the distance measuring camera compared with the conventional pattern projection type distance measuring camera. For the reasons stated above, the present invention is industrially applicable.

The invention claimed is:

1. A distance measuring camera, comprising:
   a first optical system for collecting light from a subject to form a first subject image;
   a second optical system for collecting the light from the subject to form a second subject image;
   an imaging part for imaging the first subject image formed by the first optical system and the second subject image formed by the second optical system; and
   a distance calculating part for calculating a distance to the subject based on the first subject image and the second subject image imaged by the imaging part,
   wherein an optical axis of the first optical system and an optical axis of the second optical system are parallel to each other and do not coincide with each other,
   wherein the first optical system and the second optical system are configured so that a change of a magnification of the first subject image according to the distance to the subject is different from a change of a magnification of the second subject image according to the distance to the subject,
   wherein the distance calculating part calculates the distance to the subject by using at least:
      an image magnification ratio between the magnification of the first subject image and the magnification of the second subject image,
      a focal length of the first optical system, and
      a focal length of the second optical system, and
   wherein the image magnification ratio between the magnification of the first subject image and the magnification of the second subject image changes according to the distance to the subject.

2. The distance measuring camera as claimed in claim 1, wherein the first optical system and the second optical system are configured so that the focal length of the first optical system and the focal length of the second optical system are different from each other, and thereby the change of the magnification of the first subject image according to the distance to the subject is different from the change of the magnification of the second subject image according to the distance to the subject.

3. The distance measuring camera as claimed in claim 2, wherein at least one of the first optical system and the second optical system contains a convex lens for collecting the light from the subject and a concave lens for diffusing the light from the subject.

4. The distance measuring camera as claimed in claim 3, wherein in a case where both of the first optical system and the second optical system contain the convex lens and the concave lens, the first optical system and the second optical system are configured so that the focal length of the first optical system and the focal length of the second optical system are different from each other by adjusting the number, positions and focal lengths of the concave lenses contained in the first optical system and the second optical system.

5. The distance measuring camera as claimed in claim 1, further comprising a first lens actuator for performing a focusing operation for the first optical system and a second lens actuator for performing a focusing operation for the second optical system,
   wherein the first optical system, the second optical system and the imaging part are arranged so as to focus on an infinite distance point in an initial state that the first lens actuator and the second lens actuator do not perform the focusing operations.

6. The distance measuring camera as claimed in claim 5, wherein a depth disparity in an optical axis direction exists between a front principal point of the first optical system in the initial state and a front principal point of the second optical system in the initial state, and thereby the change of the magnification of the first subject image according to the distance to the subject is different from the change of the magnification of the second subject image according to the distance to the subject.

7. The distance measuring camera as claimed in claim 1, further comprising an association information storage part storing association information for associating the image magnification ratio between the magnification of the first subject image and the magnification of the second subject image with the distance to the subject,
   wherein the distance calculating part calculates the distance to the subject based on the image magnification ratio between the magnification of the first subject image and the magnification of the second subject image and the association information in the association information storage part.

8. The distance measuring camera as claimed in claim 1, wherein the distance calculating part calculates a ratio between a size of the first subject image and a size of the second subject image as the image magnification ratio between the magnification of the first subject image and the magnification of the second subject image.

9. The distance measuring camera as claimed in claim 1, further comprising a first bandpass filter for passing only light in a specific wavelength band of the light from the subject collected by the first optical system and a second bandpass filter for passing only light in a specific wavelength band of the light from the subject collected by the second optical system,
   wherein the specific wavelength band of the light which can pass through the first bandpass filter is different from the specific wavelength band of the light which can pass through the second bandpass filter.

10. The distance measuring camera as claimed in claim 1, wherein the imaging part contains a first image sensor for imaging the first subject image and a second image sensor for imaging the second subject image.

11. The distance measuring camera as claimed in claim 1, wherein the imaging part is a single image sensor for imaging both of the first subject image and the second subject image.

12. The distance measuring camera as claimed in claim 1, further comprising a first lens actuator for performing a focusing operation for the first optical system and a second lens actuator for performing a focusing operation for the second optical system,
  wherein the first optical system, the second optical system and the imaging part are arranged so as to focus on an infinite distance point in an initial state that the first lens actuator and the second lens actuator do not perform the focusing operations, and
  wherein the distance calculating part calculates the distance to the subject by further using a depth disparity in an optical axis direction between a front principal point of the first optical system in the initial state and a front principal point of the second optical system in the initial state.

13. A distance measuring camera, comprising:
  a first optical system for collecting light from a subject to form a first subject image;
  a second optical system for collecting the light from the subject to form a second subject image;
  an imaging part for imaging the first subject image formed by the first optical system and the second subject image formed by the second optical system;
  a distance calculating part for calculating a distance to the subject based on the first subject image and the second subject image imaged by the imaging part; and
  an association information storage part storing association information for associating an image magnification ratio between a magnification of the first subject image and a magnification of the second subject image with the distance to the subject,
  wherein the first optical system and the second optical system are configured so that a change of the magnification of the first subject image according to the distance to the subject is different from a change of the magnification of the second subject image according to the distance to the subject, and
  wherein the distance calculating part calculates the distance to the subject based on the image magnification ratio between the magnification of the first subject image and the magnification of the second subject image and the association information in the association information storage part.

* * * * *